(12) United States Patent
Lu et al.

(10) Patent No.: US 11,182,419 B2
(45) Date of Patent: Nov. 23, 2021

(54) USER FUNNEL STAGE SCORE DETERMINATION

(71) Applicant: Oath Inc., New York, NY (US)

(72) Inventors: Wenmiao Lu, Champaign, IL (US); Jed Ho Chou, Mesa, AZ (US); Kehan Jiang, Urbana, IL (US); Jeremy Alexander Kanterman, Scotch Plains, NJ (US)

(73) Assignee: VERIZON MEDIA INC., New York, NY (US)

( * ) Notice: Subject to any disclaimer, the term of this patent is extended or adjusted under 35 U.S.C. 154(b) by 268 days.

(21) Appl. No.: 16/299,380

(22) Filed: Mar. 12, 2019

(65) Prior Publication Data

US 2020/0293568 A1 Sep. 17, 2020

(51) Int. Cl.
*G06F 16/00* (2019.01)
*G06F 16/435* (2019.01)
(Continued)

(52) U.S. Cl.
CPC ............ *G06F 16/437* (2019.01); *G06F 16/45* (2019.01); *G06N 20/00* (2019.01);
(Continued)

(58) Field of Classification Search
CPC .... G06F 16/9535; G06F 3/017; G06F 3/0325; G06F 16/244; G06F 2203/04108; G06F 30/20; G06F 3/041; G06F 40/205; G06F 3/011; G06F 16/248; G06F 3/033; G06F 11/3438; G06F 16/00; G06F 16/40; G06F 16/957; G06F 21/10; G06F 3/04842; G06F 3/04845; G06F 3/04847; G06F 3/14; G06F 40/30; G06F 16/23; G06F 16/24578; G06F 16/2468; G06F 16/3329; G06F 16/3344; G06F 16/345; G06F 16/36; G06F 16/437; G06F 16/45; G06F 16/54; G06F 16/7867; G06F 16/9024; G06F 16/90328; G06F 16/904; G06F 16/951; G06F 2201/81;
(Continued)

(56) References Cited

U.S. PATENT DOCUMENTS 10,242,373 B1 * 3/2019 Shariff ............... G06Q 30/0261
10,331,713 B1 * 6/2019 Chahal .................. G06F 16/313
(Continued)

*Primary Examiner* — Yicun Wu
(74) *Attorney, Agent, or Firm* — Cooper Legal Group, LLC

(57) ABSTRACT

One or more computing devices, systems, and/or methods are provided. A user profile database may be analyzed to identify a first set of user profiles associated with conversion events associated with a first entity and/or a second set of user profiles that are not associated with conversion events associated with the first entity. A first set of vector representations may be generated based upon the first set of user profiles. A second set of vector representations may be generated based upon the second set of user profiles. A request for content associated with a client device may be received. A first vector representation may be generated based upon a first user profile associated with the client device. A user funnel stage score associated with the first entity may be generated based upon the first vector representation, the first set of vector representations and/or the second set of vector representations.

20 Claims, 13 Drawing Sheets

(51) Int. Cl.
*G06F 16/45* (2019.01)
*G06N 20/00* (2019.01)
*G06Q 30/02* (2012.01)
*H04L 29/08* (2006.01)

(52) U.S. Cl.
CPC ......... G06Q 30/0255 (2013.01); H04L 67/22 (2013.01); H04L 67/306 (2013.01)

(58) Field of Classification Search
CPC .... G06F 3/04815; G06F 3/0482; G06F 40/10; G06F 40/295; G06F 40/58; G06F 9/30156; G06F 9/54; G06Q 30/02; G06Q 30/0269; G06Q 30/0273; G06Q 30/0625; G06Q 30/0631; G06Q 10/083; G06Q 10/087; G06Q 10/107; G06Q 30/0609; G06Q 30/0633; G06Q 30/0635; G06Q 30/08; G06Q 30/0202; G06Q 10/04; G06Q 30/06; G06Q 10/00; G06Q 30/0255; G06Q 30/0601; G06Q 30/0617; G06Q 30/0623; G06Q 30/0643; G06Q 50/01

See application file for complete search history.

(56) References Cited

U.S. PATENT DOCUMENTS

2012/0221411 A1* 8/2012 Graham, Jr. ........... G06Q 30/02
705/14.52
2015/0178691 A1* 6/2015 Lineberger ............ G06F 40/134
705/7.19

* cited by examiner

USER FUNNEL STAGE SCORE DETERMINATION

BACKGROUND

Many applications, such as websites, applications, etc. may provide platforms for viewing media. For example, a user may interact with a service, where the service may use user information associated with the user to determine interests of the user. For example, media may be selected for the user based upon the interests of the user.

SUMMARY

In accordance with the present disclosure, one or more computing devices and/or methods are provided. In an example, a user profile database may be analyzed to identify a first set of user profiles associated with a first set of client devices and/or a second set of user profiles associated with a second set of client devices. Each client device of the first set of client devices may be associated with a conversion event associated with a first entity. Alternatively and/or additionally, each user profile of the first set of user profiles may comprise activity information associated with a client device of the first set of client devices. Each client device of the second set of client devices may not be associated with a conversion event associated with the first entity. Alternatively and/or additionally, each user profile of the second set of user profiles may comprise activity information associated with a client device of the second set of client devices. A first set of vector representations may be generated based upon the first set of user profiles. Each vector representation of the first set of vector representations may be associated with a user profile of the first set of user profiles. A second set of vector representations may be generated based upon the second set of user profiles. Each vector representation of the second set of vector representations may be associated with a user profile of the second set of user profiles. A request for content associated with a first client device may be received. The user profile database may be analyzed to identify a first user profile associated with the first client device. The first user profile may comprise first activity information associated with the first client device. A first vector representation may be generated based upon the first user profile. A user funnel stage score associated with the first entity may be generated based upon the first vector representation, the first set of vector representations and/or the second set of vector representations. A transmission content item may be selected for transmission to the first client device based upon the user funnel stage score.

In an example, a user profile database may be analyzed to identify a first set of user profiles associated with a first set of client devices and/or a second set of user profiles associated with a second set of client devices. Each client device of the first set of client devices may be associated with a conversion event associated with a first entity. Alternatively and/or additionally, each user profile of the first set of user profiles may comprise activity information associated with a client device of the first set of client devices. Each client device of the second set of client devices may not be associated with a conversion event associated with the first entity. Alternatively and/or additionally, each user profile of the second set of user profiles may comprise activity information associated with a client device of the second set of client devices. A first set of vector representations may be generated based upon the first set of user profiles. Each vector representation of the first set of vector representations may be associated with a user profile of the first set of user profiles. A second set of vector representations may be generated based upon the second set of user profiles. Each vector representation of the second set of vector representations may be associated with a user profile of the second set of user profiles. The user profile database may be analyzed to identify a third set of user profiles (e.g., a set of one or more user profiles) associated with a third set of client devices (e.g., a set of one or more client devices). Each user profile of the third set of user profiles may comprise activity information associated with a client device of the third set of client devices. A third set of vector representations (e.g., a set of one or more vector representations) may be generated based upon the third set of user profiles. Each vector representation of the third set of vector representations may be associated with a user profile of the third set of user profiles. A set of user funnel stage scores (e.g., a set of one or more user funnel stage scores) associated with the first entity may be generated based upon the third set of vector representations, the first set of vector representations and/or the second set of vector representations.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
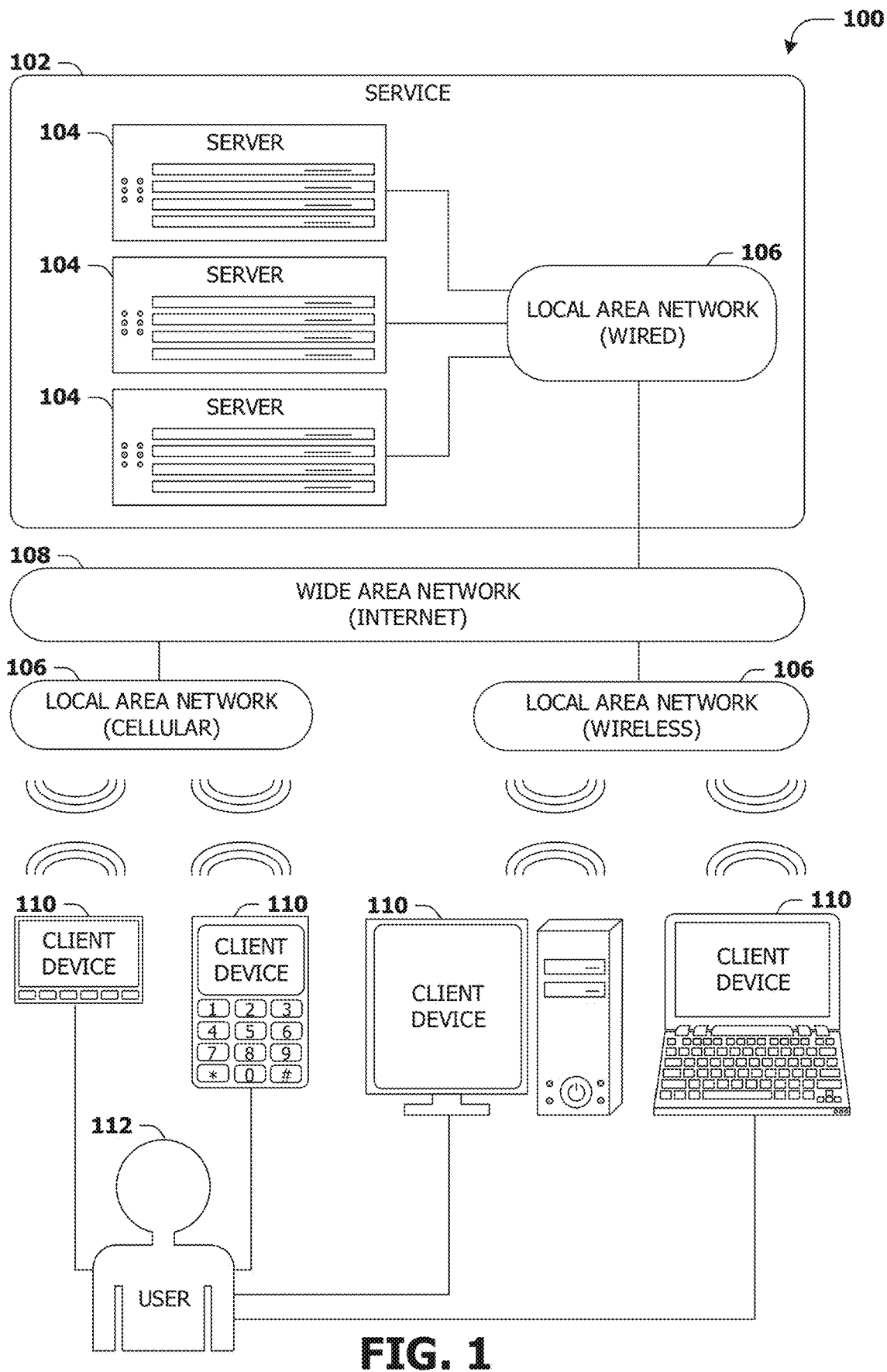
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
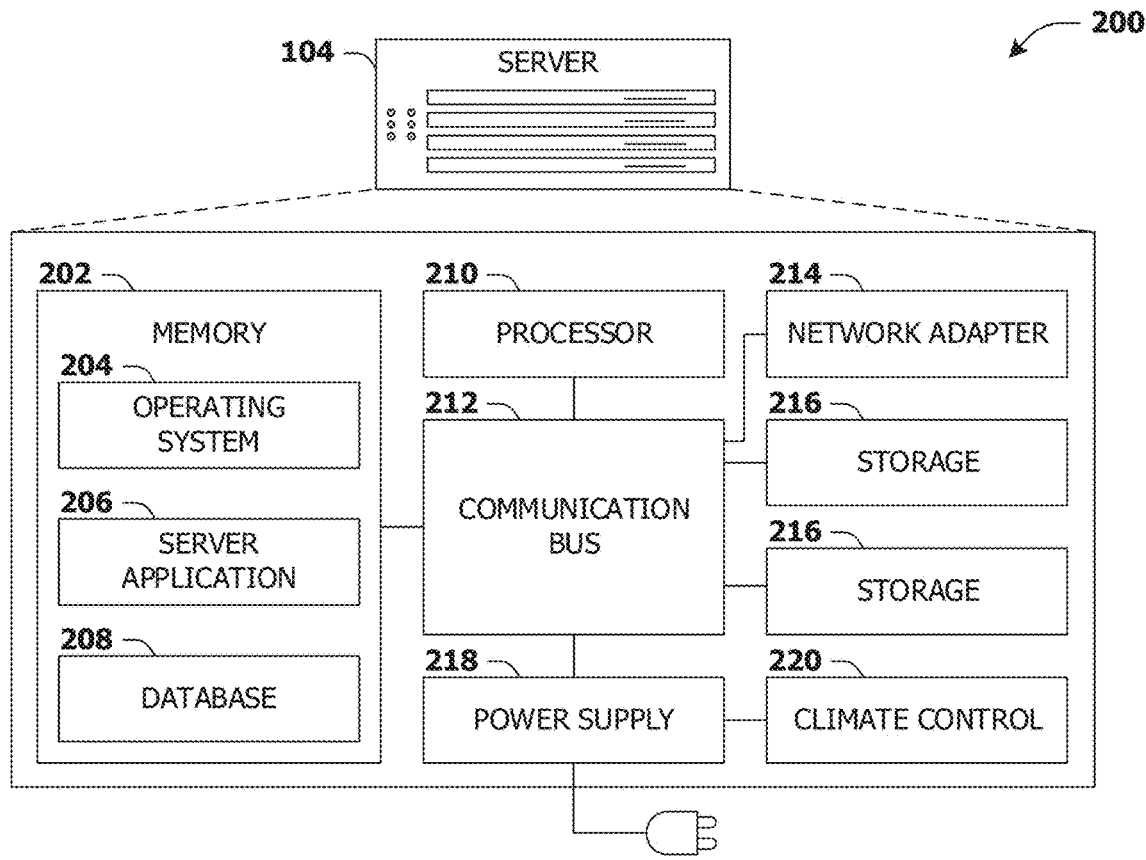
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
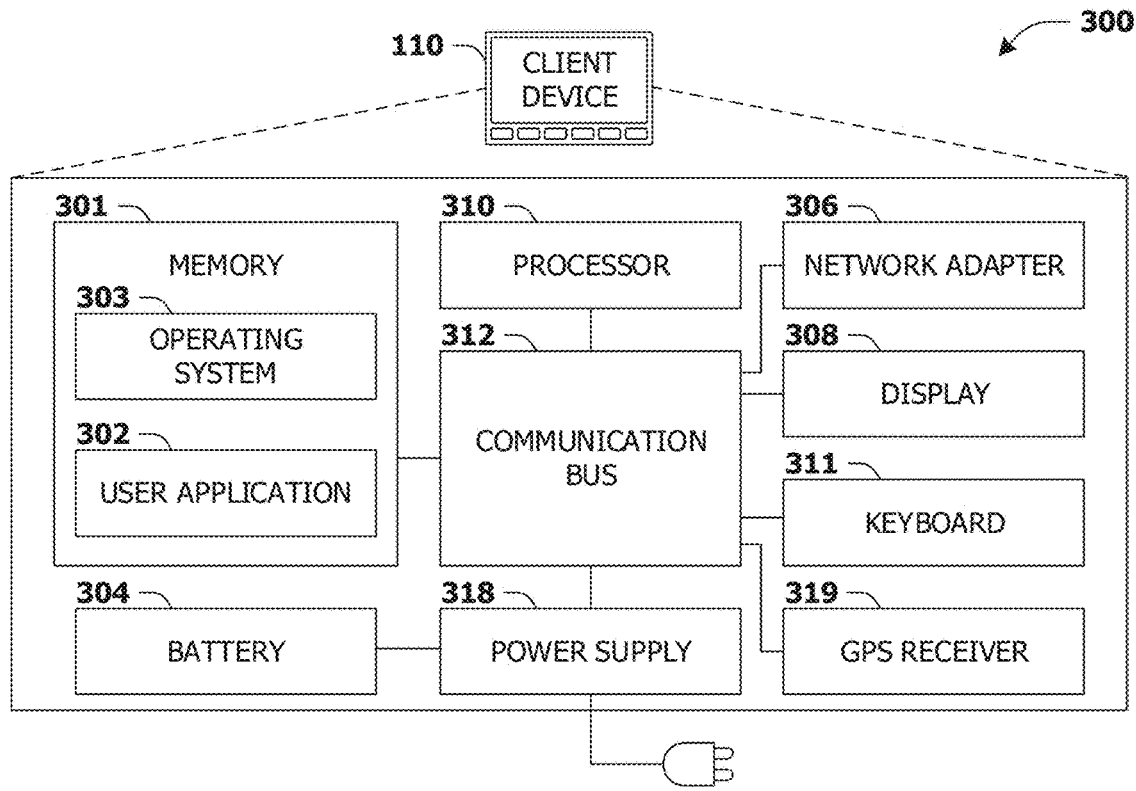
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for determining user funnel stage scores and/or selecting content for transmission to devices based upon the user funnel stage scores are provided. For example, a user (and/or a device associated with the user) may access and/or interact with a service, such as a browser, software, a website, an application, an operating system, etc. that provides a platform for viewing and/or downloading content from a server associated with a content system. In some examples, the content system may use user information, such as activity information (e.g., search history information, website browsing history, email information, etc.), user demographic information, location information, etc. to determine interests of the user. For example, the user information may be received from the device (and/or one or more other devices associated with the user and/or a user account associated with the user). Alternatively and/or additionally, the user information may be received from servers associated with websites visited by the user, servers associated with an email account of the user, etc.

For example, it may be determined (by the content system) that the user visited a first website associated with first subject matter. A first content item, associated with a first entity, may be selected for the user based upon the first subject matter. For example, the first subject matter may be associated with cars and/or the first entity may be a first advertiser associated with a car brand. However, the content system may not take a funnel stage associated with the user and/or the first entity into account. In some examples, the funnel stage may correspond to a stage (part) of a process (e.g., a purchase funnel) through which the user may approach a conversion (e.g., a purchase event, purchasing of a product associated with the first entity, purchasing of a service associated with the first entity, etc.). For example, the funnel stage associated with the user may be a first funnel stage "unaware" (e.g., where the user may be unaware of the first entity, the product associated with the first entity, the service associated with the first entity). However, the content item may be associated with a funnel stage different than the first funnel stage, where the content item may comprise subject matter that the user may not respond to (e.g., the content item may comprise an indication of a product sales discount, which the user may not be interested in as a result of the user being unaware of the first entity).

Thus, in accordance with one or more of the techniques presented herein, a first vector representation may be generated based upon a user profile comprising the user information. A user funnel stage score associated with the first entity may be generated based upon the first vector representation, a first set of vector representations associated with conversion events and/or a second set of vector representations that are not associated with conversion events. A transmission content item may be selected for transmission to the first client device based upon the user funnel stage score. The content item may be transmitted to the device associated with the user.

Figure 4:
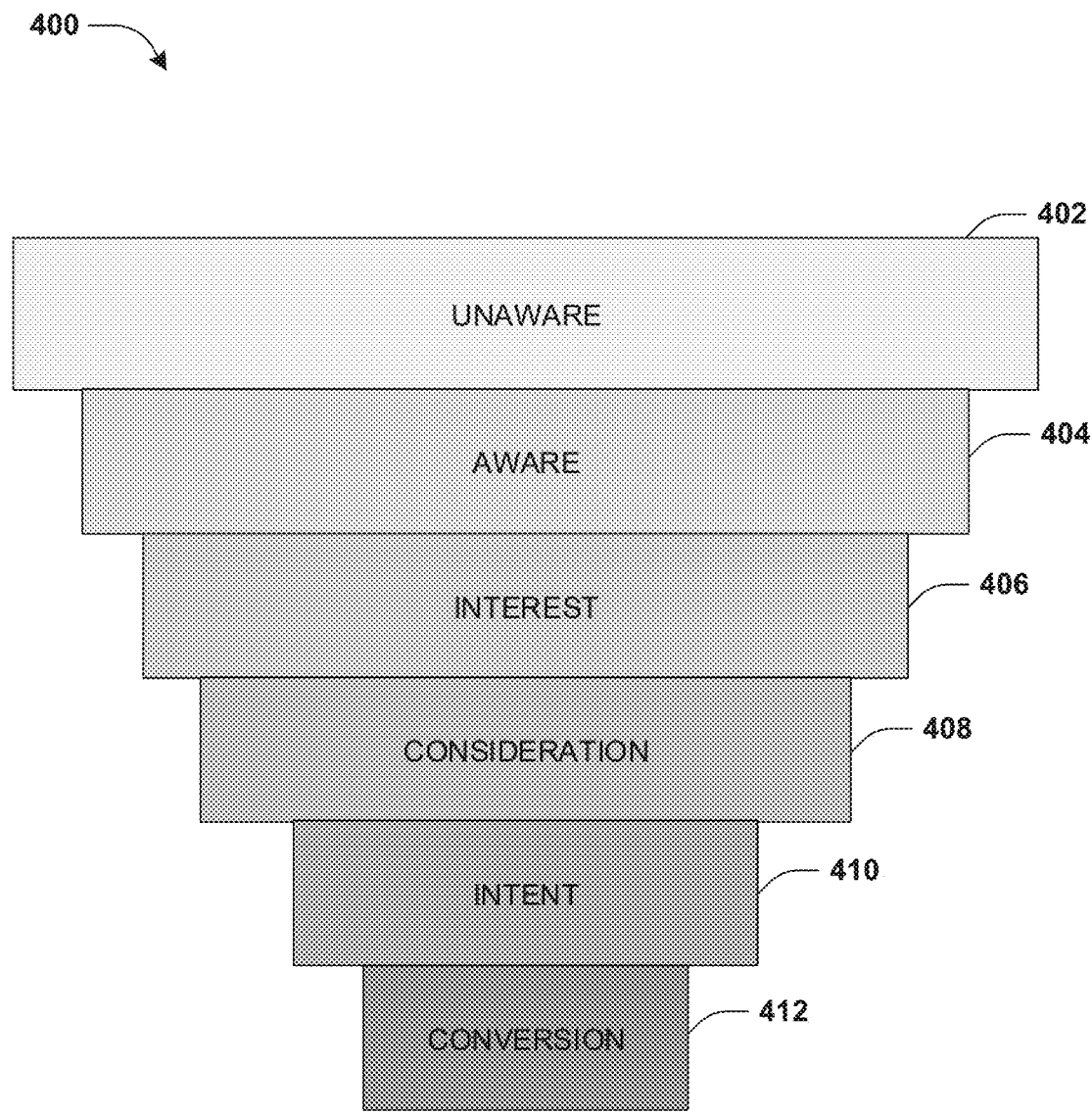
FIG. 4 is a diagram illustrating an example purchase funnel.

FIG. 4 illustrates an example of a purchase funnel diagram 400. The purchase funnel diagram 400 may be a representation of a purchase funnel (e.g., a buying funnel, a sales funnel, a marketing funnel, etc.). The purchase funnel is a staged process that a consumer may undergo when purchasing a product and/or a service. For example, the purchase funnel may comprise a plurality of stages. A quantity of stages of the plurality of stages may differ between representations of the purchase funnel (e.g., some representations of the purchase funnel may comprise four stages, whereas other representations of the purchase funnel may comprise six stages). Alternatively and/or additionally, names of stages of the plurality of stages may differ between representations of the purchase funnel.

In some examples, the purchase funnel may be associated with an entity. For example, the entity may be an advertiser, a company, an organization, etc. Alternatively and/or additionally, the entity may be associated with a product (e.g., cars, food, electronics, etc.) and/or a service (e.g., repair services, catering services, home improvement services, etc.).

In some examples, the purchase funnel may begin with a first stage 402 "unaware". The first stage 402 "unaware" may be wider than other stages of the purchase funnel, which signifies that more users may be included in the first stage 402 than other stages of the purchase funnel. A user may be in the first stage 402 "unaware" if the user has not read articles, received emails, performed searches, etc. related to the entity. Alternatively and/or additionally, the user may be in the first stage 402 if the user is likely to use and/or benefit from the product and/or the service that the entity provides (which may be determined based upon activity information (e.g., search history information, website browsing history, email information, etc.), user demographic information, location information, search history information, website browsing history, email history, etc. associated with the user and/or a user account associated with the user). For example, if the user is a homeowner and/or the entity is a home improvement company, the user may be likely to use the product and/or the service that the entity provides and/or the user may correspond to the first stage 402 "unaware". Alternatively and/or additionally, if the user is a parent of one or more children and/or the entity is a theme park company offering entertainment to children, it the user may be likely to use the product and/or the service that the entity provides and/or the user may correspond to the first stage 402 "unaware".

Alternatively and/or additionally, the purchase funnel may comprise a second stage 404 "aware". The second stage 404 "aware" may follow (e.g., succeed) the first stage 402 "unaware" in the purchase funnel. The user may be in the second stage 404 "aware" if the user has read articles, received emails, performed searches, etc. related to the entity. For example, if the user has read an article related to information associated with one or more home improvement services and/or the entity is the home improvement company, the user may be aware of the entity, the product and/or the service and/or the user may correspond to the second stage 404 "aware". Alternatively and/or additionally, if the user has read an article related to information associated with one or more theme park characters and/or the entity is the theme park company, the user may be aware of the product and/or the service and/or the user may correspond to the second stage 404 "aware".

Alternatively and/or additionally, the purchase funnel may comprise a third stage 406 "interest". The third stage 406 "interest" may follow the second stage 404 "aware" in the purchase funnel. The user may be in the third stage 406 "interest" if the user has read articles, received emails, performed searches, etc. related to the entity. Alternatively and/or additionally, the user may be in the third stage 406 "interest" if the user performs research into information associated with the entity, the product and/or the service. For example, if the user has watched a video comprising a tutorial for using the product and/or the service, the user may be interested in the entity, the product and/or the service and/or the user may correspond to the third stage 406 "interest". Alternatively and/or additionally, if the user has read one or more reviews associated with the entity, the product and/or the service, the user may be interested in the entity, the product and/or the service and/or the user may correspond to the third stage 406 "interest".

Alternatively and/or additionally, the purchase funnel may comprise a fourth stage 408 "consideration". The fourth stage 408 "consideration" may follow the third stage 406 "interest" in the purchase funnel. The user may be in the fourth stage 408 "consideration" if the user has read articles, received emails, composed emails, performed searches, etc. related to the entity. Alternatively and/or additionally, the user may be in the fourth stage 408 "consideration" if the user performs research into information associated with the entity, the product and/or the service. Alternatively and/or additionally, the user may be in the fourth stage 408 "consideration" if the user performs research into other information associated with a second entity, a second product and/or a second service similar to the entity, the product and/or the service (e.g., the second entity, the second product and/or the second service may compete with the entity, the product and/or the service). Alternatively and/or additionally, the user may be in the fourth stage 408 "consideration" if the user accesses one or more webpages provided by the entity and/or one or more web pages (directly) associated with the product, the service and/or the entity. For example, if the user accesses one or more webpages (e.g., theme park webpages, home improvement webpages, etc.) provided by the entity (e.g., the theme park company, the home improvement company, etc.), the user may be evaluating and/or considering the entity, the product and/or the service and/or the user may correspond to the fourth stage 408 "consideration".

Alternatively and/or additionally, the purchase funnel may comprise a fifth stage 410 "intent". The fifth stage 410 "intent" may follow the fourth stage 408 "consideration" in the purchase funnel. The user may be in the fifth stage 410 "intent" if the user has read articles, received emails, composed emails, performed searches, etc. related to the entity. Alternatively and/or additionally, the user may be in the fifth stage 410 "intent" if the user performs research into prices (associated with the entity, the product and/or the service), discounts (associated with the entity, the product and/or the service), coupons (associated with the entity, the product and/or the service), etc. For example, if the user accesses one or more webpages comprising information associated with pricing, discounts and/or coupons associated with the entity, the product and/or the service, the user may be intent on purchasing the product and/or the service and/or the user may correspond to the fifth stage 410 "intent".

Alternatively and/or additionally, the purchase funnel may comprise a sixth stage 412 "conversion". The sixth stage 412 "conversion" may follow the fifth stage 410 "intent" in the purchase funnel. The user may be determined to be in the sixth stage 412 "conversion" if the user made a purchase associated with the entity, the product and/or the service. For example, the user may be determined to be in the sixth stage 412 "conversion" if an email account associated with the user account received a purchase confirmation email indicative of the purchase. Alternatively and/or additionally, the user may be determined to be in the sixth stage 412 "conversion" if the user has subscribed to, signed up for and/or created an account for the service (e.g., the service may be associated with one or more of an email subscription, an email service, a service provided via an application, a newspaper service, etc.). In an example, the entity may be a transportation network company (e.g., a ridesharing company) and/or the user may be determined to be in the sixth stage 412 "conversion" if the user signed up to be a driver for the transportation network company. The user may be determined to be in the sixth stage 412 "conversion" based upon a received and/or identified message (e.g., an email) indicating that the user signed up for the transportation network company.

Figure 5:
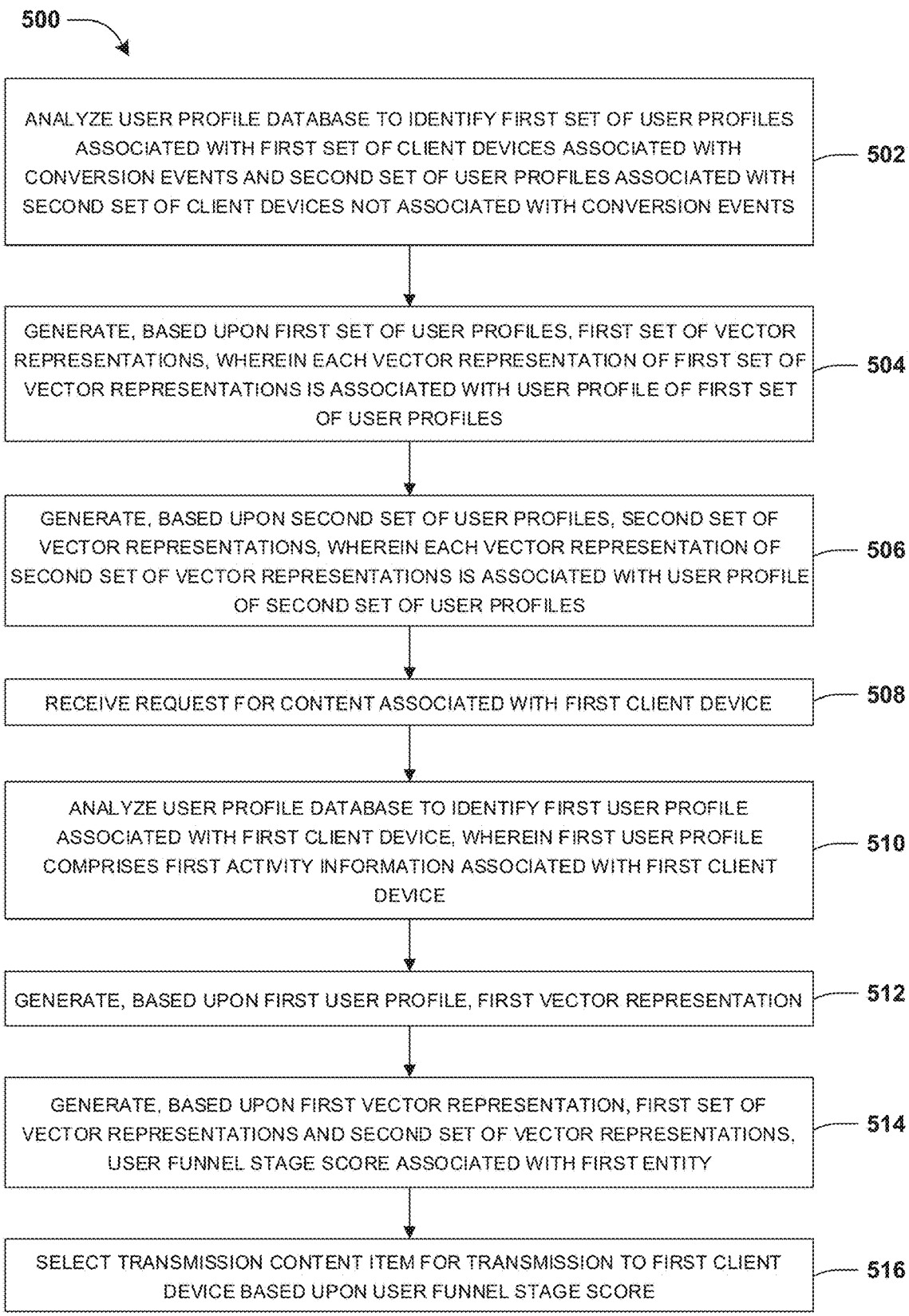
FIG. 5 is a flow chart illustrating an example method for determining user funnel stage scores and/or selecting content for transmission to devices.

An embodiment of determining user funnel stage scores and/or selecting content for transmission to devices is illustrated by an example method 500 of FIG. 5. A content system for presenting content via client devices may be provided. In some examples, the content system may be an advertisement system (e.g., an online advertising system). Alternatively and/or additionally, the content system may provide content items to be presented via pages associated with the content system. For example, the pages may be associated with websites (e.g., websites providing search engines, email services, news content, communication services, etc.) associated with the content system. The content system may provide content items to be presented in (dedicated) locations throughout the pages (e.g., one or more areas of the pages configured for presentation of content items). For example, a content item may be presented at the top of a web page associated with the content system (e.g., within a banner area), at the side of the web page (e.g., within a column), in a pop-up window, overlaying content of the web page, etc. Alternatively and/or additionally, a content item may be presented within an application associated with the content system and/or within a game associated with the content system. Alternatively and/or additionally, a user may be required to watch and/or interact with the content item before the user can access content of a web page, utilize resources of an application and/or play a game.

In some examples, the content system may provide content items for presentation via client devices based upon (past) user activity associated with the client devices. For examples, the content system may generate and/or maintain a user profile database comprising a plurality of user profiles associated with a plurality of client devices and/or a plurality of user accounts (e.g., email accounts, content platform accounts for uploading content, consuming articles, videos and/or music, etc.) associated with the content system. Each user profile of the plurality of user profiles may comprise activity information associated with a client device and/or a user account. For example, the activity information may be indicative of one or more of one or more consumed content items (e.g., an article, a video, an audio file, an image, a webpage, an advertisement, an email, a message, etc. consumed by a user), one or more accessed content items (e.g., an article, a video, an audio file, an image, a webpage, an advertisement, an email, a message, etc. accessed by a client device), one or more selected content items (e.g., an article, a video, an audio file, an image, a webpage, an advertisement, an email, a message, etc. selected via a client device), one or more content item interactions (e.g., an advertisement impression, an advertisement click, a conversion associated with an advertisement, etc.), etc.

In some examples, a first entity may access and/or interact with a service, such as an advertising service, that provides a platform for uploading, to the content system, content to be presented via client devices. In some examples, the first entity may be an advertiser, a company, a brand, an organization, etc. One or more content items (e.g., one or more advertisements) associated with the first entity, and/or associated with one or more products, one or more services, etc. associated with the first entity, may be received from a device associated with the first entity. For example, the first entity may upload, to the content system, the one or more content items. The one or more content items may be associated with an advertisement campaign for promoting the one or more products and/or the one or more services associated with the first entity. Alternatively and/or additionally, content information associated with the advertisement campaign may be received from the device associated with the entity. For example, the content information may comprise one or more of a budget associated with the advertisement campaign, a duration of time for which the one or more content items shall be presented by the content system, one or more advertisement campaign goals associated with the advertisement campaign and/or the one or more content items (e.g., a number of impressions associated with the one or more content items, a number of interactions associated with the one or more content items, etc.), etc.

At 502, the user profile database may be analyzed to identify a first set of user profiles associated with a first set of client devices and/or a second set of user profiles associated with a second set of client devices. The user profile database may be analyzed based upon the first entity, the one or more content items (associated with the advertisement campaign), the one or more products and/or the one or more services to identify the first set of user profiles and/or the second set of user profiles.

Each client device of the first set of client devices (and/or each user profile of the first set of user profiles) may be associated with a conversion event associated with the first entity. Alternatively and/or additionally, each user profile of the first set of user profiles may comprise activity information associated with a client device of the first set of client devices. In some examples, a conversion event associated with the first entity may correspond to one or more of a purchase of a product of the one or more products associated with the first entity, a purchase of a service of the one or more services associated with the first entity, subscribing to (and/or signing up for) a service of the one or more services associated with the first entity, contacting the first entity (e.g., contacting the first entity via one or more of email, phone, etc.), a selection of a content item of the one or more content items, an interaction with a content item of the one or more content items, an impression associated with a content item of the one or more content items, accessing a webpage associated with the first entity, etc.

In some examples, conversion event information may be retrieved from a database and/or may be received from the device associated with the first entity. The conversion event information may be indicative of one or more actions that constitute an occurrence of a conversion event (with respect to the first entity and/or the advertisement campaign). For example, conversion event information may indicative of a set of actions, wherein each action of the set of actions constitute a conversion event (e.g., the set of actions may comprise one or more of a purchase of a product of the one or more products associated with the first entity, a purchase of a service of the one or more services associated with the first entity, subscribing to (and/or signing up for) a service of the one or more services associated with the first entity, contacting the first entity (e.g., contacting the first entity via one or more of email, phone, etc.), a selection of a content item of the one or more content items, an interaction with a content item of the one or more content items, an impression associated with a content item of the one or more content items, accessing a webpage associated with the first entity, etc.).

In some examples, a conversion event associated with the first entity may be detected by monitoring and/or analyzing user activity of the plurality of client devices associated with the content system. For example, an exemplary user profile of the plurality of user profiles (of the user profile database) may be selected for inclusion in the first set of user profiles responsive to detecting a selection of a content item of the one or more content items via an exemplary client device associated with the exemplary user profile (and/or responsive to identifying, within the exemplary user profile, an indication of the selection of the content item of the one or more content items). Alternatively and/or additionally, the exemplary user profile may be selected for inclusion in the first set of user profiles responsive to detecting an interaction with a content item of the one or more content items via the exemplary client device (and/or responsive to identifying, within the exemplary user profile, an indication of the interaction with the content item of the one or more content items). Alternatively and/or additionally, the exemplary user profile may be selected for inclusion in the first set of user profiles responsive to detecting an impression associated with a content item of the one or more content items via the exemplary client device (and/or responsive to identifying, within the exemplary user profile, an indication of the impression). Alternatively and/or additionally, the exemplary user profile may be selected for inclusion in the first set of user profiles responsive to detecting that a webpage associated with the first entity is accessed using the exemplary client device (and/or responsive to identifying, within the exemplary user profile, an indication of the webpage).

Alternatively and/or additionally, messages (e.g., messages, emails, etc.) associated with (an email account associated with) the exemplary user profile may be analyzed to identify one or more exemplary messages (e.g., emails) indicative of one or more of a purchase of a product of the one or more products, a purchase of a service of the one or more services, a subscription to a service of the one or more services, a confirmation that the exemplary client device and/or a user associated with the exemplary client device contacted the first entity and/or signed up for a service of the one or more services, etc. For example, the exemplary user profile may be selected for inclusion in the first set of user profiles based upon the one or more exemplary messages.

Alternatively and/or additionally, conversion information may be received from the device associated with the first entity. The conversion information may be indicative of client devices (and/or user accounts) associated with conversion events. For example, the exemplary user profile may be selected for inclusion in the first set of user profiles based upon the conversion information (e.g., the exemplary user profile may be selected for inclusion in the first set of user profiles responsive to identifying an indication of the exemplary client device and/or an exemplary user account associated with the exemplary user profile within the conversion information).

In some examples, each client device of the second set of client devices (and/or each user profile of the second set of user profiles) may not be associated with a conversion event associated with the first entity. Alternatively and/or additionally, each user profile of the second set of user profiles may comprise activity information associated with a client device of the second set of client devices. In some examples, an exemplary user profile of the plurality of user profiles (of the user profile database) may be selected for inclusion in the second set of user profiles responsive to determining that one or more actions of the set of actions that constitute a conversion event are not performed by an exemplary client device (and/or an exemplary user account) associated with the exemplary user profile. Alternatively and/or additionally, the exemplary user profile may be selected for inclusion in the second set of user profiles responsive to determining that an indication of the exemplary client device (and/or the exemplary user account) is not comprised within the conversion information. Alternatively and/or additionally, one or more client devices of the second set of client devices may be associated with a conversion event associated with the first entity.

Alternatively and/or additionally, an exemplary user profile of the plurality of user profiles (of the user profile database) may be selected for inclusion in the second set of user profiles responsive to determining that one or more actions of the set of actions that constitute a conversion event are not performed within a threshold duration of time prior to a current time by an exemplary client device (and/or an exemplary user account) associated with the exemplary user profile (e.g., the threshold duration of time may be one or more of 1 day, 1 week, 1 month, etc.). In an example, the threshold duration of time may be 1 week. Alternatively and/or additionally, the exemplary user profile may be indicative of one or more actions of the set of actions that constitute a conversion event and/or the one or more actions may be associated with two weeks prior to the current time. Accordingly, the exemplary user profile may be selected for inclusion in the second set of user profiles.

At 504, a first set of vector representations may be generated based upon the first set of user profiles. In some examples, each vector representation of the first set of vector representations may be associated with a user profile of the first set of user profiles. Alternatively and/or additionally, a first set of bag of words representations may be generated based upon the first set of user profiles. In some examples, each bag of words representation of the first set of bag of words representations may be indicative of a set of activities performed using a client device associated with a user profile of the first set of user profiles and/or a quantity of occasions associated with each activity of the set of activities (e.g., each bag of words representation of the first set of bag of words representations may be indicative of a plurality of quantities of occasions, where each quantity of occasions of the plurality of quantities of occasions may be associated with an activity of a set of activities associated with a user profile of the first set of user profiles).

In an example, a first exemplary bag of words representation of the first set of bag of words representations may be generated based upon an exemplary user profile of the first set of user profiles. The exemplary user profile may be indicative of a plurality of activity events and/or a plurality of timestamps associated with the plurality of activity events. In some examples, more than one activity event of the plurality of activity events may correspond to a single activity (e.g., an exemplary client device and/or a user associated with the exemplary user profile may perform the single activity on more than one occasion). In some examples, the first exemplary bag of words representation may comprise a plurality of keys (e.g., a plurality of words) indicative of a plurality of activities indicated by the exemplary user profile. Alternatively and/or additionally, the first exemplary bag of words representation may comprise a plurality of values associated with the plurality of keys, wherein each value of the plurality of values is indicative of a quantity of occasions that an activity associated with a key is (and/or has been) performed (using the exemplary client device associated with the exemplary user profile).

For example, a first exemplary key of the plurality of keys (of the first exemplary bag of words representation) may be indicative of a first exemplary query (e.g., "Dog names") being inputted into a search interface (e.g., a web search engine designed to search for information throughout the internet) associated with the content system, an exemplary list of search results being generated based upon the first exemplary query and/or the exemplary list of search results associated with the first exemplary query being presented via the search interface. Alternatively and/or additionally, a first exemplary value of the plurality of values may be indicative of an exemplary quantity of occasions associated with the first exemplary key. For example, the exemplary quantity of occasions may correspond to a quantity of occasions that the first exemplary query is inputted into the search interface, a quantity of occasions that an exemplary list of search results is generated based upon the first exemplary query and/or a quantity of occasions that an exemplary list of search results associated with the first exemplary query is presented via the search interface.

In some examples, the first set of vector representations may be generated based upon the first set of bag of words representations. In an example, a first exemplary vector representation of the first set of vector representations may be generated based upon the first exemplary bag of words representation of the first set of bag of words representations. A plurality of representations (e.g., one or more of vector representations, embeddings, word embeddings, etc.) may be generated based upon the plurality of activities associated with the first exemplary bag of words representation (e.g., the plurality of keys). For example, each representation of the plurality of representations may be generated based upon an activity of the plurality of activities (and/or a key of the plurality of keys). Alternatively and/or additionally, the plurality of representations may be generated using one or more machine learning techniques. For example, the plurality of representations may be generated and/or trained using a Global Vectors (GloVe) machine learning model (and/or a different type of machine learning model) in association with a text corpus.

In some examples, the first exemplary vector representation may be generated based upon the plurality of representations. Alternatively and/or additionally, the first exemplary vector representation may be generated based upon a plurality of activity weights associated with the plurality of representations. For example, each activity weight of the plurality of activity weights may be associated with a quantity of occasions associated with an activity corresponding to a representation of the plurality of representations (e.g., each activity weight of the plurality of activity weights may be generated based upon a quantity of occasions associated with an activity corresponding to a representation of the plurality of representations). For example, each activity weight of the plurality of activity weights may be generated based upon a value of the plurality of values (wherein the value is indicative of a quantity of occasions that an activity is (and/or has been) performed using the exemplary client device associated with the exemplary user profile).

Alternatively and/or additionally, the first exemplary representation may be generated based upon a plurality of global activity weights. Each global activity weight of the plurality of global activity weights may be associated with a frequency of occasions associated with an activity corresponding to a representation of the plurality of representations (e.g., each global activity weight of the plurality of global activity weights may be generated based upon a quantity of occasions associated with an activity corresponding to a representation of the plurality of representations).

In an example, a first global activity weight of the plurality of global activity weights may be associated with a first frequency of occasions associated with a first exemplary activity of the plurality of activities (associated with the first exemplary bag of words representation). The first frequency of occasions may correspond to a rate at which client devices associated with the plurality of user profiles of the user profile database perform the first activity and/or a quantity of occasions that the first activity is performed by the client devices associated with the plurality of user profiles of the user profile database. Alternatively and/or additionally, the first frequency of occasions may correspond to a rate at which the first set of client devices associated with the first set of user profiles and/or the second set of client devices associated with the second set of user profiles perform the first activity and/or a quantity of occasions that the first activity is performed by the first set of client devices associated with the first set of user profiles and/or the second set of client devices associated with the second set of user profiles.

In some examples, one or more operations (e.g., mathematical operations) may be performed using the plurality of representations, the plurality of activity weights and/or the plurality of global activity weights to generate the first exemplary vector representation (e.g., the first exemplary vector representation may correspond to a combination of the plurality of representations, the plurality of activity weights and/or the plurality of global activity weights). For example, the first exemplary vector representation may be generated using an equation:

$$v = \frac{1}{|u|} \Sigma_{w \in u} \frac{m(w)}{m(w) + p(w)} v_w,$$

where v corresponds to the first exemplary vector representation, |u| corresponds to a quantity of activities of the plurality of activities (and/or a quantity of keys of the plurality of keys) associated with the exemplary user profile, w corresponds to an activity of the plurality of activities, u corresponds to the plurality of activities (and/or the plurality of keys), m(w) corresponds to an activity weight of the plurality of activity weights associated with the activity of the plurality of activities, p(w) corresponds to a global activity weight of the plurality of global activity weights associated with the activity of the plurality of activities and/or $v_w$ corresponds to a representation of the plurality of representations associated with the activity of the plurality of activities.

At 506, a second set of vector representations may be generated based upon the second set of user profiles. In some examples, each vector representation of the second set of vector representations may be associated with a user profile of the second set of user profiles. Alternatively and/or additionally, a second set of bag of words representations may be generated based upon the second set of user profiles. In some examples, each bag of words representation of the second set of bag of words representations may be indicative of a set of activities performed using a client device associated with a user profile of the second set of user profiles and/or a quantity of occasions associated with each activity of the set of activities (e.g., each bag of words representation of the second set of bag of words representations may be indicative of a plurality of quantities of occasions, where each quantity of occasions of the plurality of quantities of occasions may be associated with an activity of a set of activities associated with a user profile of the second set of user profiles). The second set of vector representations may be generated based upon the second set of bag of words representations.

Figure 6A:
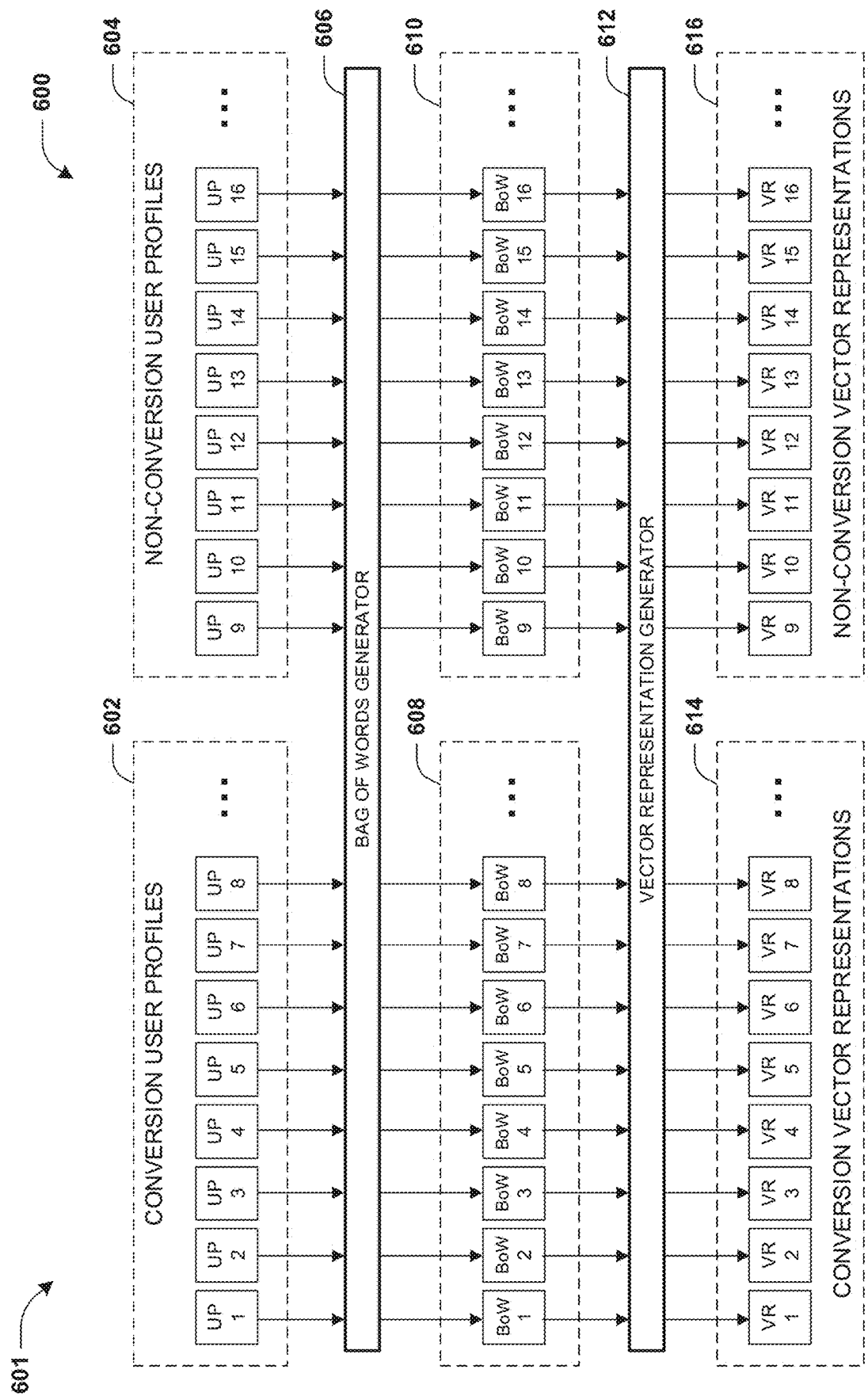
FIG. 6A is a component block diagram illustrating an example system for generating a first set of vector representations and/or a second set of vector representations and/or performing machine learning model training using the first set of vector representations and/or the second set of vector representations, where a set of conversion vector representations and/or a set of non-conversion vector representations are generated based upon a set of conversion user profiles and/or a set of non-conversion user profiles.
Figure 6B:
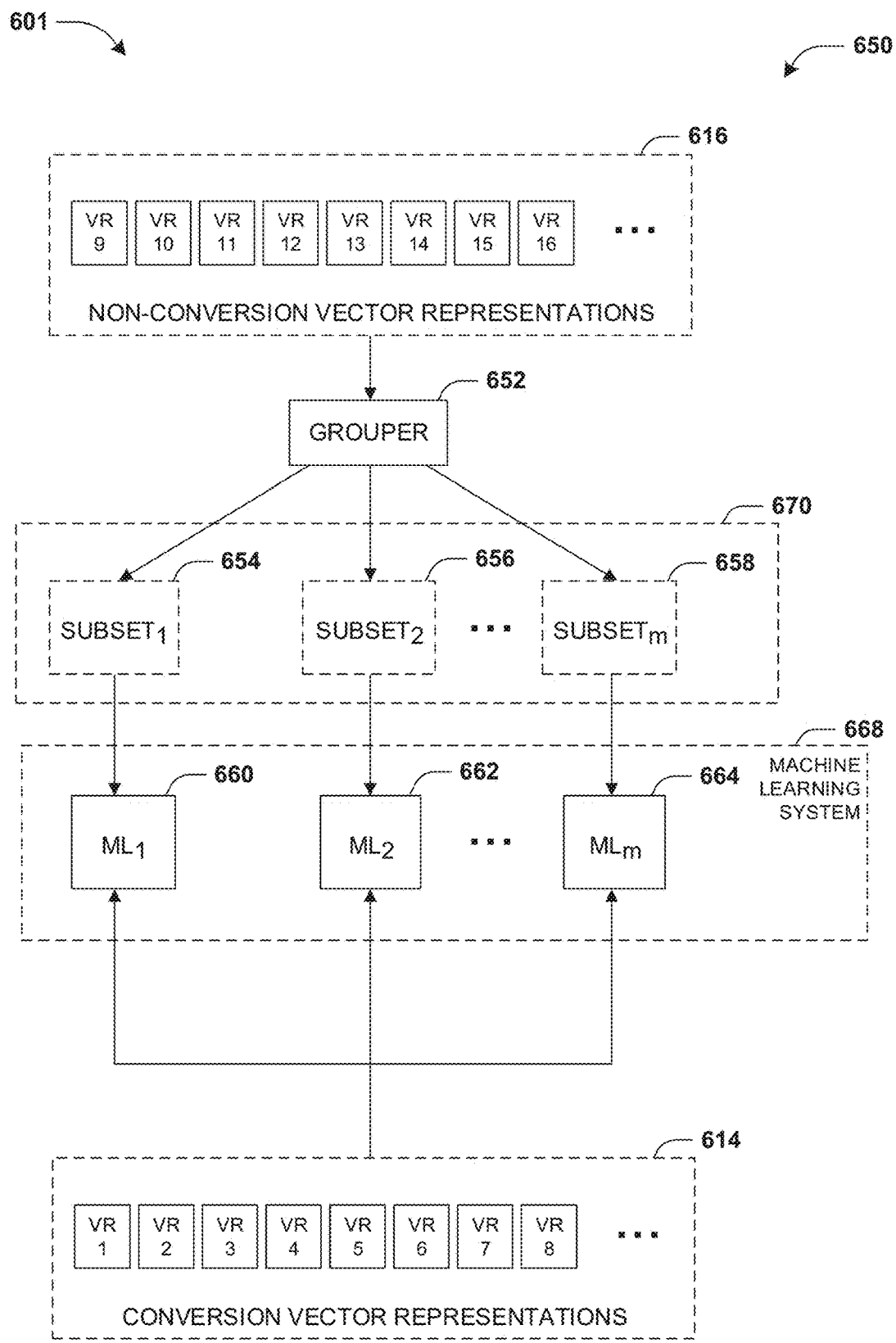
FIG. 6B is a component block diagram illustrating an example system for generating a first set of vector representations and/or a second set of vector representations and/or performing machine learning model training using the first set of vector representations and/or the second set of vector representations, where a machine learning system is trained using a set of conversion vector representations and/or a set of non-conversion vector representations.

FIGS. 6A-6B illustrate an exemplary system 601 for generating the first set of vector representations and/or the second set of vector representations and/or performing machine learning model training using the first set of vector representations and/or the second set of vector representations. FIG. 6A illustrates an exemplary scenario 600 in which a set of conversion vector representations 614 (e.g., the first set of vector representations) and/or a set of non-conversion vector representations 616 (e.g., the second set of vector representations) are generated based upon a set of conversion user profiles 602 (e.g., the first set of user profiles) and/or a set of non-conversion user profiles 604 (e.g., the second set of user profiles).

In some examples, the set of conversion user profiles 602 may comprise user profiles (e.g., "UP 1", "UP 2", etc.) associated with client devices associated with conversion events (associated with the first entity). Alternatively and/or additionally, the set of non-conversion user profiles 604 may comprise user profiles (e.g., "UP 9", "UP 10", etc.) associated with client devices that are not associated with conversion events (associated with the first entity).

In some examples, a bag of words generator 606 may generate a set of conversion bag of words representations 608 (e.g., the first set of bag of words representations) based upon the set of conversion user profiles 602. Alternatively and/or additionally, the bag of words generator 606 may generate a set of non-conversion bag of words representations 610 (e.g., the second set of bag of words representations) based upon the set of non-conversion user profiles 604.

In some examples, the set of conversion bag of words representations 608 may comprise bag of words representations (e.g., "BoW 1", "BoW 2", etc.) associated with client devices associated with conversion events (associated with the first entity). Alternatively and/or additionally, the set of non-conversion bag of words representations 610 may comprise bag of words representations (e.g., "BoW 9", "BoW 10", etc.) associated with client devices that are not associated with conversion events (associated with the first entity).

In some examples, a vector representation generator 612 may generate the set of conversion vector representations 614 based upon the set of conversion bag of words representations 608. Alternatively and/or additionally, the vector representation generator 612 may generate the set of non-conversion vector representations 616 based upon the set of non-conversion bag of words representations 610.

In some examples, the set of conversion vector representations 614 may comprise vector representations (e.g., "VR 1", "VR 2", etc.) associated with client devices associated with conversion events (associated with the first entity).

Alternatively and/or additionally, the set of non-conversion vector representations 616 may comprise vector representations (e.g., "VR 9", "VR 10", etc.) associated with client devices that are not associated with conversion events (associated with the first entity).

In some examples, conversion probabilities and/or user funnel stage scores associated with user profiles (that may not be within the first set of user profiles and/or the second set of user profiles) may be determined based upon the first set of vector representations and/or the second set of vector representations. For example, an exemplary conversion probability score and/or an exemplary user funnel stage score associated with an exemplary user profile (that may not be within the first set of user profiles and/or the second set of user profiles) may be generated based upon an exemplary vector representation (associated with the exemplary user profile), the first set of vector representations and/or the second set of vector representations.

In some examples, the exemplary conversion probability score may be indicative of a probability that an exemplary user and/or an exemplary client device associated with the exemplary user profile will perform a conversion event (associated with the first entity and/or the advertisement campaign). Alternatively and/or additionally, the exemplary conversion probability score may be indicative of a probability that the exemplary user and/or the exemplary client device will perform a conversion event (associated with the first entity and/or the advertisement campaign) within a second threshold duration of time (e.g., one or more of 1 day, 1 week, 1 month, etc.). Alternatively and/or additionally, the user funnel stage score may be a representation of a funnel stage (e.g., associated with a purchase funnel (e.g., and/or a buying funnel, a sales funnel, a marketing funnel, etc.), an example of which is illustrated in FIG. 4) that the exemplary user is associated with, with respect to the first entity and/or the advertisement campaign.

In some examples, the user funnel stage score may be determined based upon the exemplary conversion probability score. For example, if the exemplary conversion probability score is a first probability value (and/or within a first range of probability values), the user funnel stage score may be indicative of a first stage (e.g., "unaware") of a plurality of stages of the purchase funnel. Alternatively and/or additionally, if the exemplary conversion probability score is a second probability value (and/or within a second range of probability values), the user funnel stage score may be indicative of a second stage (e.g., "aware") of the plurality of stages. In some examples, the second probability value and/or the second range of probability values may be higher (and/or lower) than the first probability value and/or the first range of probability values. Alternatively and/or additionally, if the exemplary conversion probability score is a third probability value (and/or within a third range of probability values), the user funnel stage score may be indicative of a third stage (e.g., "interest") of the plurality of stages. In some examples, the third probability value and/or the third range of probability values may be higher (and/or lower) than the second probability value and/or the second range of probability values. Alternatively and/or additionally, if the exemplary conversion probability score is a fourth probability value (and/or within a fourth range of probability values), the user funnel stage score may be indicative of a fourth stage (e.g., "consideration") of the plurality of stages. In some examples, the fourth probability value and/or the fourth range of probability values may be higher (and/or lower) than the third probability value and/or the third range of probability values. Alternatively and/or additionally, if the exemplary conversion probability score is a fifth probability value (and/or within a fifth range of probability values), the user funnel stage score may be indicative of a fifth stage (e.g., "intent") of the plurality of stages. In some examples, the fifth probability value and/or the fifth range of probability values may be higher (and/or lower) than the fourth probability value and/or the fourth range of probability values. Alternatively and/or additionally, if the exemplary conversion probability score is a sixth probability value (and/or within a sixth range of probability values), the user funnel stage score may be indicative of a sixth stage (e.g., "conversion") of the plurality of stages. In some examples, the sixth probability value and/or the sixth range of probability values may be higher (and/or lower) than the fifth probability value and/or the fifth range of probability values.

In some examples, the exemplary conversion probability score and/or the exemplary user funnel stage score may be generated based upon a comparison of the exemplary vector representation with the first set of vector representations and/or with the second set of vector representations. Alternatively and/or additionally, the exemplary conversion probability score and/or the exemplary user funnel stage score may be generated based upon a similarity between the exemplary vector representation and the first set of vector representations and/or a similarity between the exemplary vector representation and the second set of vector representations.

In some examples, the second set of vector representations may be grouped (e.g., divided and/or separated) into a plurality of subsets of vector representations (e.g., the second set of vector representations may be grouped randomly into the plurality of subsets of vector representations). In some examples, a quantity of subsets of vector representations may be based upon one or more of a difference between a first quantity of vector representations of the first set of vector representations and a second quantity of vector representations of the second set of vector representations, a proportion and/or a ratio associated with the first quantity of vector representations and the second quantity of vector representations, etc. For example, the quantity of subsets of vector representations may be equal to a combination of a combining value and a ratio (and/or a proportion) of the second quantity of vector representations to the first quantity of vector representations. For example, if the combining value is equal to 5, the first quantity of vector representations is 100 and/or the second quantity of vector representations is 10,000 (where the ratio of the second quantity of vector representations to the first quantity of vector representations is 100), the quantity of subsets of vector representations may be equal to 100 divided by 5 (e.g., 20). Accordingly, a quantity of vector representations of each subset of vector representations of the plurality of subsets of vector representations may be (approximately) 5 times greater than the first quantity of vector representations of the first set of vector representations (due to the combining value being equal to 5).

In some examples, a plurality of exemplary conversion probability scores may be generated based upon the exemplary vector representation, the first set of vector representations and/or the plurality of subsets of vector representations. For example, each conversion probability score of the plurality of exemplary conversion probability scores may be generated based upon a subset of vector representations of the plurality of subsets of vector representations, the first set of vector representations and/or the exemplary vector representation. Alternatively and/or additionally, the plurality of exemplary conversion probability scores may be combined (e.g., averaged) to generate the exemplary conversion probability score and/or the exemplary user funnel stage score.

In some examples, the exemplary conversion probability and/or the exemplary user funnel stage score may be generated using a machine learning system (e.g., a classification system). For example, the machine learning system may be configured to generate the exemplary conversion probability and/or the exemplary user funnel stage score based upon the exemplary vector representation, the first set of vector representations and/or the second set of vector representations. In some examples, the machine learning system may be trained using the first set of vector representations and/or the second set of vector representations.

Alternatively and/or additionally, the machine learning system may comprise a plurality of machine learning models (e.g., classification models). In some examples, a quantity of machine learning models of the plurality of machine learning models may be equal to the quantity of subsets of the plurality of subsets of vector representations (of the second set of vector representations). The plurality of machine learning models may be trained using the first set of vector representations and/or the plurality of subsets of vector representations (of the second set of vector representations). For example, each machine learning model of the plurality of machine learning models may be trained using the first set of vector representations and/or a subset of vector representations of the plurality of subsets of vector representations (of the second set of vector representations).

In some examples, the exemplary vector representation (associated with the exemplary user profile) may be inputted into each machine learning model of the plurality of machine learning models. For example, each machine learning model of the plurality of machine learning models may generate a conversion probability score of the plurality of exemplary conversion probability scores (e.g., each conversion probability score of the plurality of exemplary conversion probability scores may be generated using a machine learning model of the plurality of machine learning models associated with (and/or trained using) a subset of vector representations of the plurality of subsets of vector representations).

FIG. 6B illustrates an exemplary scenario 650 in which a machine learning system 668 (e.g., the machine learning system) is trained using the set of conversion vector representations 614 (e.g., the first set of vector representations) and/or the set of non-conversion vector representations 616 (e.g., the second set of vector representations). In some examples, the set of non-conversion vector representations 616 may be grouped into a plurality of subsets of non-conversion vector representations 670 (e.g., the plurality of subsets of vector representations) by a grouper 652. A quantity of subsets of the plurality of subsets of non-conversion vector representations 670 may be equal to a value m. For example, the plurality of subsets of non-conversion vector representations 670 may comprise a first subset of non-conversion vector representations 654 (e.g., "SUBSET$_1$"), a second subset of non-conversion vector representations 656 (e.g., "SUBSET$_2$"), a third subset of non-conversion vector representations 658 (e.g., "SUBSET$_m$") and/or one or more other subsets of non-conversion vector representations.

In some examples, the machine learning system 668 (e.g., the machine learning system) may comprise a plurality of machine learning models. A quantity of machine learning models of the plurality of machine learning models may be equal to the value m. For example, the plurality of machine learning models may comprise a first machine learning model 660 (e.g., "ML$_1$"), a second machine learning model 662 (e.g., "ML$_2$"), a third machine learning model 664 (e.g., "ML$_m$") and/or one or more other machine learning models.

In some examples, the machine learning system 668 may be trained using the plurality of subsets of non-conversion vector representations 670 and/or the set of conversion vector representations 614. For example, each machine learning model of the plurality of machine learning models (of the machine learning system 668) may be trained using the set of conversion vector representations 614 and/or a subset of non-conversion vector representations of the plurality of subsets of non-conversion vector representations 670).

For example, the first machine learning model 660 may be trained using the set of conversion vector representations 614 and/or the first subset of non-conversion vector representations 654. Alternatively and/or additionally, the second machine learning model 662 may be trained using the set of conversion vector representations 614 and/or the second subset of non-conversion vector representations 656. Alternatively and/or additionally, the third machine learning model 664 may be trained using the set of conversion vector representations 614 and/or the third subset of non-conversion vector representations 658.

At 508, a request for content (e.g., a request for content 736 illustrated in FIG. 7D) associated with a first client device (e.g., a first client device 700 illustrated in FIG. 7A) may be received. In some examples, the request for content may be received from the first client device in association with a request to access a web page and/or a request to access one or more resources (e.g., one or more resources of an application (e.g., a mobile application)). Alternatively and/or additionally, the request for content may be received from a server associated with the web page and/or the one or more resources (as shown in FIGS. 7A-7D).

In some examples, a first user profile may be generated based upon user activity associated with the first client device. For example, the user activity may be performed using one or more content interfaces (e.g., one or more of websites, search interfaces, video platforms, communication interfaces, such as email and/or messaging interfaces, news content interfaces, etc.) associated with the content system. The user activity may be monitored and/or analyzed to generate the first user profile based upon the user activity. For example, the first user profile may comprise first activity information. The first activity information may be indicative of one or more of one or more consumed content items (e.g., an article, a video, an audio file, an image, a webpage, an advertisement, an email, a message, etc. consumed by a first user associated with the first client device), one or more accessed content items (e.g., an article, a video, an audio file, an image, a webpage, an advertisement, an email, a message, etc. accessed by the first client device and/or using the one or more content interfaces), one or more selected content items (e.g., an article, a video, an audio file, an image, a webpage, an advertisement, an email, a message, etc. selected via the first client device), one or more content item interactions (e.g., an advertisement impression, an advertisement click, a conversion associated with an advertisement, etc. performed using the first client device and/or the one or more content interfaces), etc.

FIGS. 7A-7F illustrate an exemplary system 701 for determining user funnel stage scores and/or selecting content for transmission to devices. A first user, such as user Jennifer, and/or a first client device 700 (e.g., the first client device) associated with the first user may access and/or interact with a service, such as a browser, software, a website, an application, an operating system, an email interface, a messaging interface, a music-streaming application, a video application, etc. that provides a platform for viewing and/or downloading content from a server associated with the content system.

Figure 7A:
FIG. 7A is a diagram illustrating an exemplary system for determining user funnel stage scores and/or selecting content for transmission to devices, where a first client device presents and/or accesses a first web page.

FIG. 7A illustrates the first client device 700 presenting and/or accessing a first web page 708 using a browser of the first client device 700. The browser may comprise an address bar 702 comprising a web address (e.g., a URL) of the first web page 708. The first web page 708 may comprise a search interface. For example, the search interface may comprise a web search engine designed to search for information throughout the internet. In some examples, the first web page 708 may comprise a search field 706. For example, a query "stock market" may be entered into the search field 706. In some examples, the first web page 708 may comprise a search selectable input 704 corresponding to performing a search based upon the query. For example, the search selectable input 704 may be selected.

Figure 7B:
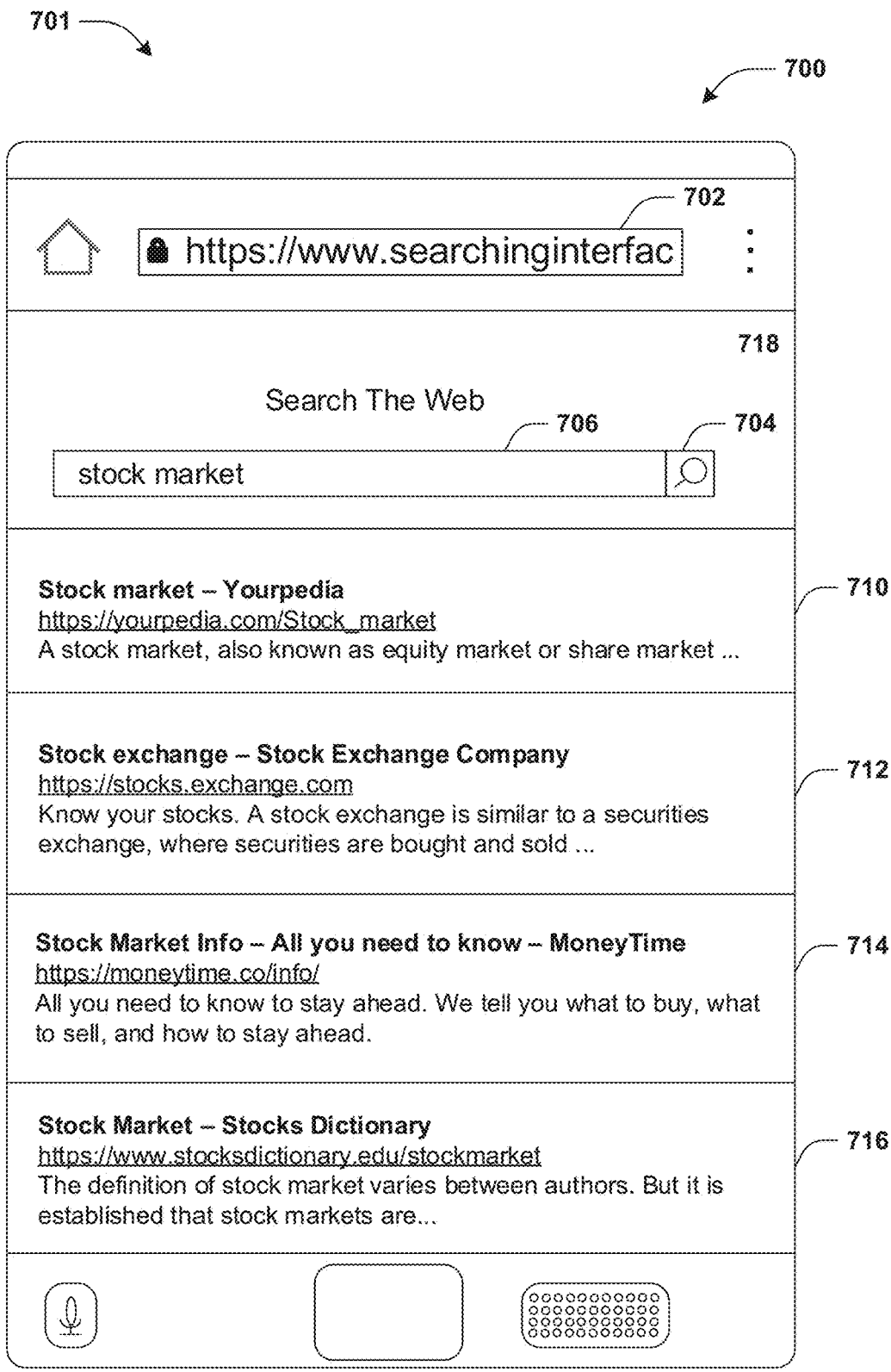
FIG. 7B is a diagram illustrating an exemplary system for determining user funnel stage scores and/or selecting content for transmission to devices, where a first client device presents a plurality of search results associated with a query.

FIG. 7B illustrates the first client device 700 presenting a plurality of search results associated with the query using the browser of the first client device 700. For example, the plurality of search results may be presented within a second web page 718. For example, the plurality of search results may comprise a first search result 710 corresponding to a third web page, a second search result 712 corresponding to a fourth web page 720 (illustrated in FIG. 7F), a third search result 714 corresponding to a fifth web page and/or a fourth search result 716 corresponding to a sixth web page.

In some examples, each search result of the plurality of search results may comprise a selectable input (e.g., a link) corresponding to accessing a web page associated with the search result. In some examples, the second search result 712 corresponding to the fourth web page 720 may be selected (e.g., the second search result 712 may be selected via a second selectable input corresponding to the second search result 712).

Figure 7C:
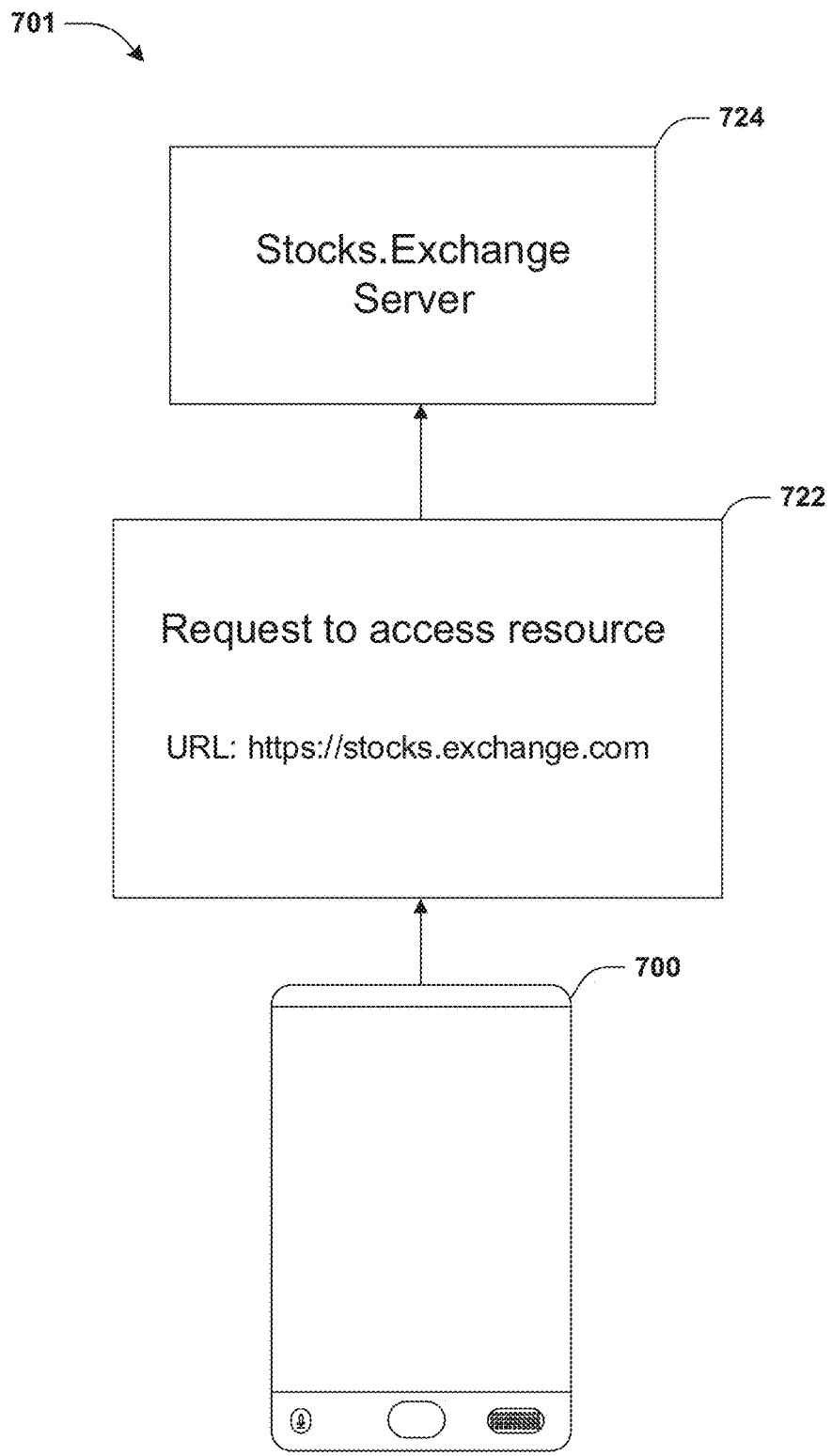
FIG. 7C is a diagram illustrating an exemplary system for determining user funnel stage scores and/or selecting content for transmission to devices, where a first client device transmits a request to access a resource to a first server.

FIG. 7C illustrates the first client device 700 transmitting a request to access a resource 722 to a first server 724. In some examples, the request to access the resource 722 may be transmitted responsive to the second search result 712 being selected. For example, the resource may correspond to the fourth web page 720. For example, the request to access the resource 722 may comprise an indication of the fourth web page 720 (e.g., a web address "https://stocks.exchange.com"). Alternatively and/or additionally, the first server 724 may be associated with the fourth web page 720.

Figure 7D:
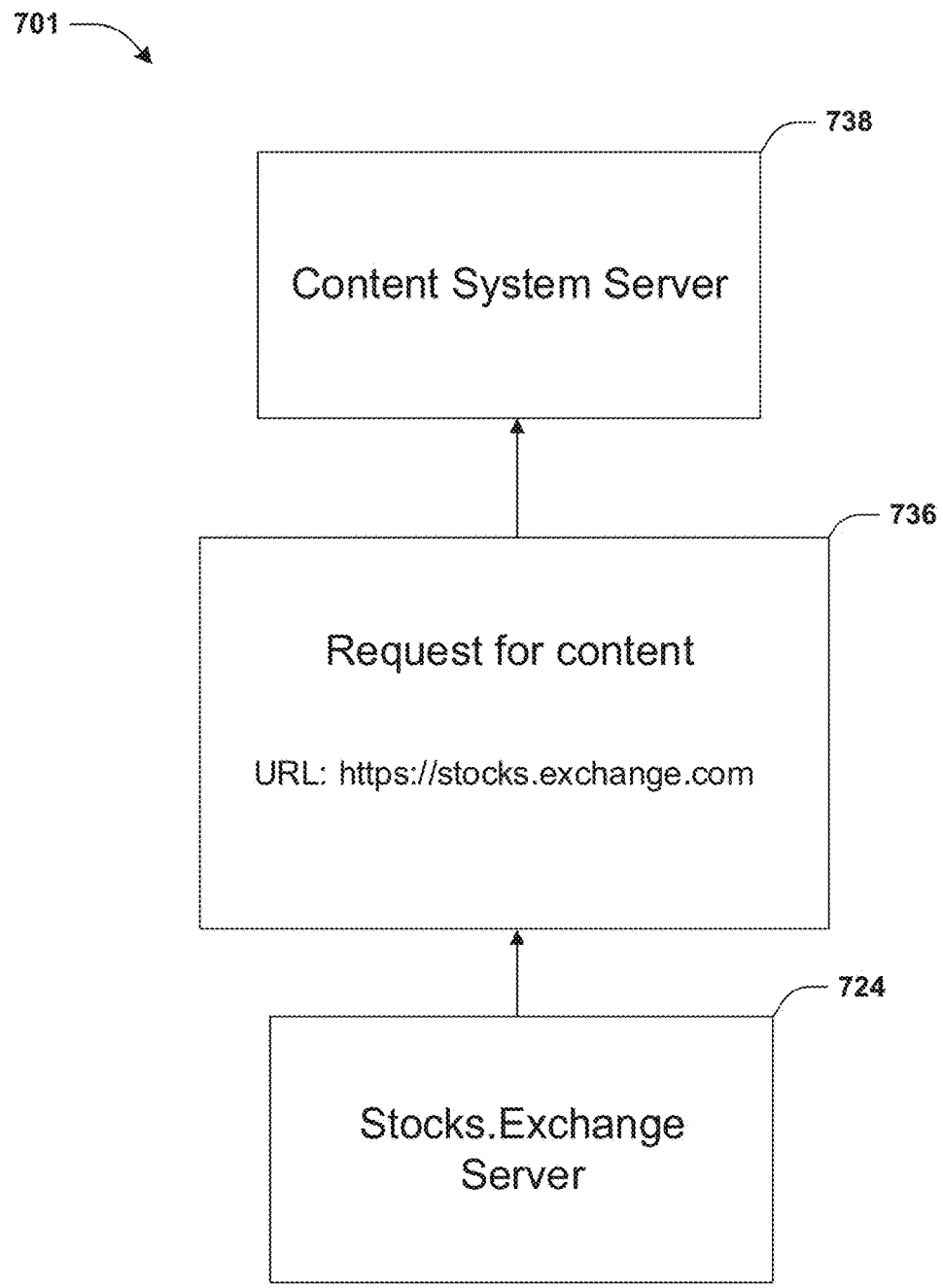
FIG. 7D is a diagram illustrating an exemplary system for determining user funnel stage scores and/or selecting content for transmission to devices, where a first server transmits a request for content to a second server associated with a content system.

FIG. 7D illustrates the first server 724 transmitting a request for content 736 to a second server 738 associated with the content system. In some examples, the request for content 736 may be transmitted (by the first server 724) responsive to receiving the request to access the resource 722. Alternatively and/or additionally, the request for content 736 may be transmitted (to the second server 738) by the first client device 700. In some examples, the request for content 736 may be a request to be provided with a transmission content item (e.g., an advertisement, an image, a link, a video, etc.) (for presentation via the fourth web page 720).

At 510, the user profile database may be analyzed to identify the first user profile, comprising the first activity information, associated with the first client device. For example, the user profile database may be analyzed based upon identification information (e.g., one or more of client device identification information, an IP address, a network identification address associated with a network that the first client device is connected to, etc.) of the first client device to identify the first user profile. For example, the identification information may be determined based upon the request for content (e.g., the request for content may comprise the identification information). Alternatively and/or additionally, the first user profile may comprise the identification information. For example, the first user profile may be identified based upon a determination that the identification information of the request for content matches the first user profile.

Alternatively and/or additionally, the first client device and/or the first user may be associated with a first user account (e.g., an email account, a content platform account, etc.) with the content system. For example, the first client device may be logged into the first user account (via the one or more content interfaces). In some examples, the first user profile may comprise an indication of the first user account (e.g., the first user profile may comprise a username associated with the first user account). The user profile database may be analyzed based upon the first user account (e.g., the username) to identify the first user profile. For example, the first user account and/or the username may be determined based upon the request for content (e.g., the request for content may comprise the username).

At 512, a first vector representation (e.g., a first vector representation 740 illustrated in FIG. 7E) may be generated based upon the first user profile. For example, a first bag of words representation may be generated based upon the first user profile. In some examples, the first bag of words representation may be indicative of a first set of activities (associated with the first activity information of the first user profile) and/or a first set of quantities of occasions. Each quantity of occasions of the first set of quantities of occasions may be associated with an activity of the first set of activities. In some examples, the first vector representation may be generated based upon the first bag of words representation. Alternatively and/or additionally, the first vector representation may be generated based upon the first user profile (automatically and/or directly, without generating the first bag of words representation).

At 514, a first user funnel stage score associated with the first entity (and/or associated with the advertisement campaign) may be generated based upon the first vector representation, the first set of vector representations and the second set of vector representations. For example, a first conversion probability score (e.g., a conversion probability score 752 illustrated in FIG. 7E) may be generated based upon the first vector representation, the first set of vector representations and the second set of vector representations. Alternatively and/or additionally, the first user funnel stage score may be generated based upon the first conversion probability score.

In some examples, the first conversion probability score and/or the first user funnel stage score may be generated based upon a comparison of the first vector representation with the first set of vector representations and/or with the second set of vector representations. Alternatively and/or additionally, the first conversion probability score and/or the first user funnel stage score may be generated based upon a similarity (and/or a difference) between the first vector representation and the first set of vector representations and/or a similarity (and/or a difference) between the first vector representation and the second set of vector representations.

For example, a greater similarity between the first vector representation and the first set of vector representations may correspond to a higher probability that the first user and/or the first client device will perform a conversion event associated with the first entity and/or the advertisement campaign (e.g., the first user may purchase a product of the one or more products, the first user may purchase a service of the one or more services, etc.). Accordingly, a greater similarity between the first vector representation and the first set of vector representations may correspond to the first conversion probability score being higher (and/or lower).

Alternatively and/or additionally, a lower similarity between the first vector representation and the first set of vector representations may correspond to a lower probability that the first user and/or the first client device will perform a conversion event associated with the first entity and/or the advertisement campaign. Accordingly, a lower similarity between the first vector representation and the first set of vector representations may correspond to the first conversion probability score being lower (and/or higher).

Alternatively and/or additionally, a greater similarity between the first vector representation and the second set of vector representations may correspond to a lower probability that the first user and/or the first client device will perform a conversion event associated with the first entity and/or the advertisement campaign. Accordingly, a greater similarity between the first vector representation and the second set of vector representations may correspond to the first conversion probability score being lower (and/or higher).

Alternatively and/or additionally, a lower similarity between the first vector representation and the second set of vector representations may correspond to a higher probability that the first user and/or the first client device will perform a conversion event associated with the first entity and/or the advertisement campaign. Accordingly, a lower similarity between the first vector representation and the second set of vector representations may correspond to the first conversion probability score being higher (and/or lower).

In some examples, a first plurality of conversion probability scores may be generated based upon the first vector representation, the first set of vector representations and/or the plurality of subsets of vector representations (of the second set of vector representations). For example, each conversion probability score of the first plurality of conversion probability scores may be generated based upon a subset of vector representations of the plurality of subsets of vector representations, the first set of vector representations and/or the first vector representation. Alternatively and/or additionally, the first plurality of conversion probability scores may be combined (e.g., averaged) to generate the first conversion probability score and/or the first user funnel stage score.

In some examples, the first conversion probability score and/or the first user funnel stage score may be generated using the machine learning system. For example, the first vector representation may be inputted into each machine learning model of the plurality of machine learning models of the machine learning system. Each machine learning model of the plurality of machine learning models may generate a conversion probability score of the first plurality of conversion probability scores.

Figure 7E:
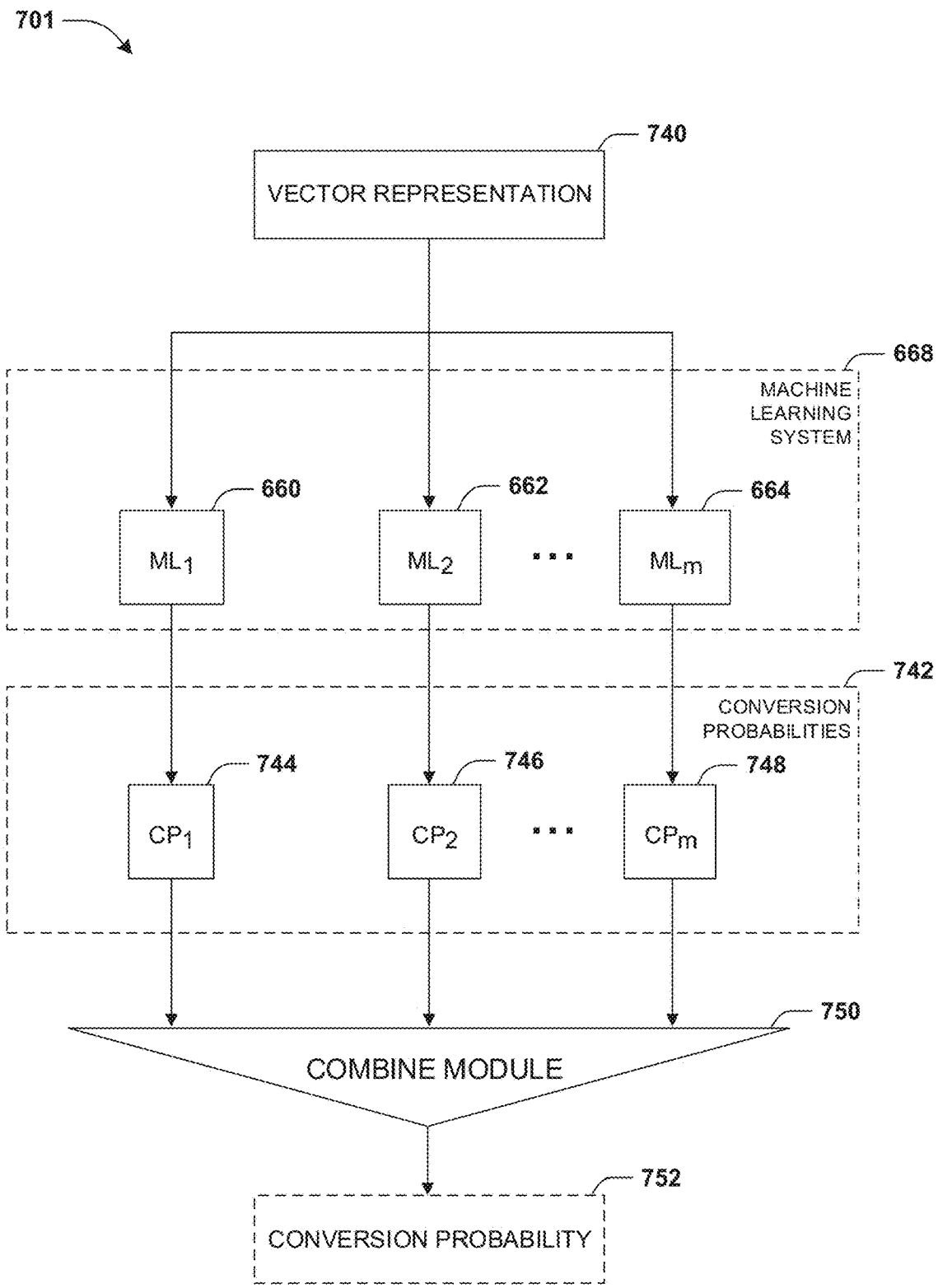
FIG. 7E is a diagram illustrating an exemplary system for determining user funnel stage scores and/or selecting content for transmission to devices, where a first conversion probability score is generated using a machine learning system.

FIG. 7E illustrates a conversion probability score 752 (e.g., the first conversion probability score) being generated using the machine learning system 668 (after the plurality of machine learning models of the machine learning system 668 are trained using the plurality of subsets of non-conversion vector representations 670 and/or the set of conversion vector representations 614).

In some examples, the machine learning system 668 may generate a plurality of conversion probability scores 742 (e.g., the first plurality of conversion probability scores) based upon a first vector representation 740 associated with the first user profile (e.g., the first vector representation 740 may be generated based upon the first user profile). For example, each machine learning model of the plurality of machine learning model may generate a conversion probability score of the plurality of conversion probability scores 742. In some examples, a quantity of conversion probability scores of the plurality of conversion probability scores 742 may be equal to the value m.

For example, the first machine learning model 660 (trained using the set of conversion vector representations 614 and/or the first subset of non-conversion vector representations 654 of the plurality of subsets of non-conversion vector representations 670) may generate a first conversion probability score 744 (e.g., "$CP_1$") of the plurality of conversion probability scores 742 based upon the first vector representation 740. Alternatively and/or additionally, the second machine learning model 662 (trained using the set of conversion vector representations 614 and/or the second subset of non-conversion vector representations 656 of the plurality of subsets of non-conversion vector representations 670) may generate a second conversion probability score 746 (e.g., "$CP_2$") of the plurality of conversion probability scores 742 based upon the first vector representation 740. Alternatively and/or additionally, the third machine learning model 664 (trained using the set of conversion vector representations 614 and/or the third subset of non-conversion vector representations 658 of the plurality of subsets of non-conversion vector representations 670) may generate a third conversion probability score 748 (e.g., "$CP_m$") of the plurality of conversion probability scores 742 based upon the first vector representation 740.

In some examples, the plurality of conversion probability scores 742 may be combined (e.g., averaged) by a combine module 750 to generate the conversion probability score 752. Alternatively and/or additionally, the first user funnel stage score may be generated based upon the conversion probability score 752 (e.g., the first conversion probability score). In some examples, the first user funnel stage score may be equal to the conversion probability score 752 (e.g., the conversion probability score 752 may be indicative of a funnel stage that the first user is associated with, with respect to the first entity and/or the advertisement campaign). Alternatively and/or additionally, the first user funnel stage score may not be equal to the conversion probability score 752.

At 516, a transmission content item may be selected for transmission to the first client device based upon the first user funnel stage score (and/or the first conversion probability score). For example, the transmission content item may be selected (for transmission to the first client device) from a content items database. In some examples, the content items database may comprise a plurality of sets of content items. Each set of content items of the plurality of sets of content items may be associated with an entity of a plurality of entities. For example, a first set of content items of the plurality of sets of content items may be associated with the first entity. For example, the first set of content items may comprise the one or more content items (associated with the advertisement campaign for promoting the one or more products and/or the one or more services associated with the first entity).

In some examples, each content item of the first set of content items may be associated with a funnel stage, associated with the purchase funnel, with respect to the first entity and/or the advertisement campaign. For example, the first set of content items may comprise one or more first content items associated with the first stage of the plurality of stages of the purchase funnel, one or more second content items associated with the second stage of the plurality of stages of the purchase funnel, one or more third content items associated with the third stage of the plurality of stages of the purchase funnel, one or more fourth content items associated with the fourth stage of the plurality of stages of the purchase funnel, one or more fifth content items associated with the fifth stage of the plurality of stages of the purchase funnel and/or one or more sixth content items associated with the sixth stage of the plurality of stages of the purchase funnel.

For example, if the user funnel stage score is associated with the fourth stage of the plurality of stages of the purchase funnel (e.g., if the user funnel stage score is equal to a value corresponding to the fourth stage), the transmission content item may be selected from the one or more fourth content items (e.g., wherein the transmission content item is associated with the fourth stage). Alternatively and/or additionally, if the user funnel stage score is associated with the second stage of the plurality of stages of the purchase funnel (e.g., if the user funnel stage score is equal to a value corresponding to the second stage), the transmission content item may be selected from the one or more second content items (e.g., wherein the transmission content item is associated with the second stage).

In some examples, content items of the first set of content items may be assigned to stages of the plurality of stages based upon inputs received from one or more client devices associated with one or more administrators (e.g., one or more engineers, one or more experts, one or more technicians, one or more people tasked with assigning stages of the plurality of stages to content items of the first set of content items, etc.) associated with the content system and/or the first entity. For example, the one or more first content items may be selected for presentation to users associated with the first funnel stage based upon inputs received from the one or more client devices.

Figure 7F:
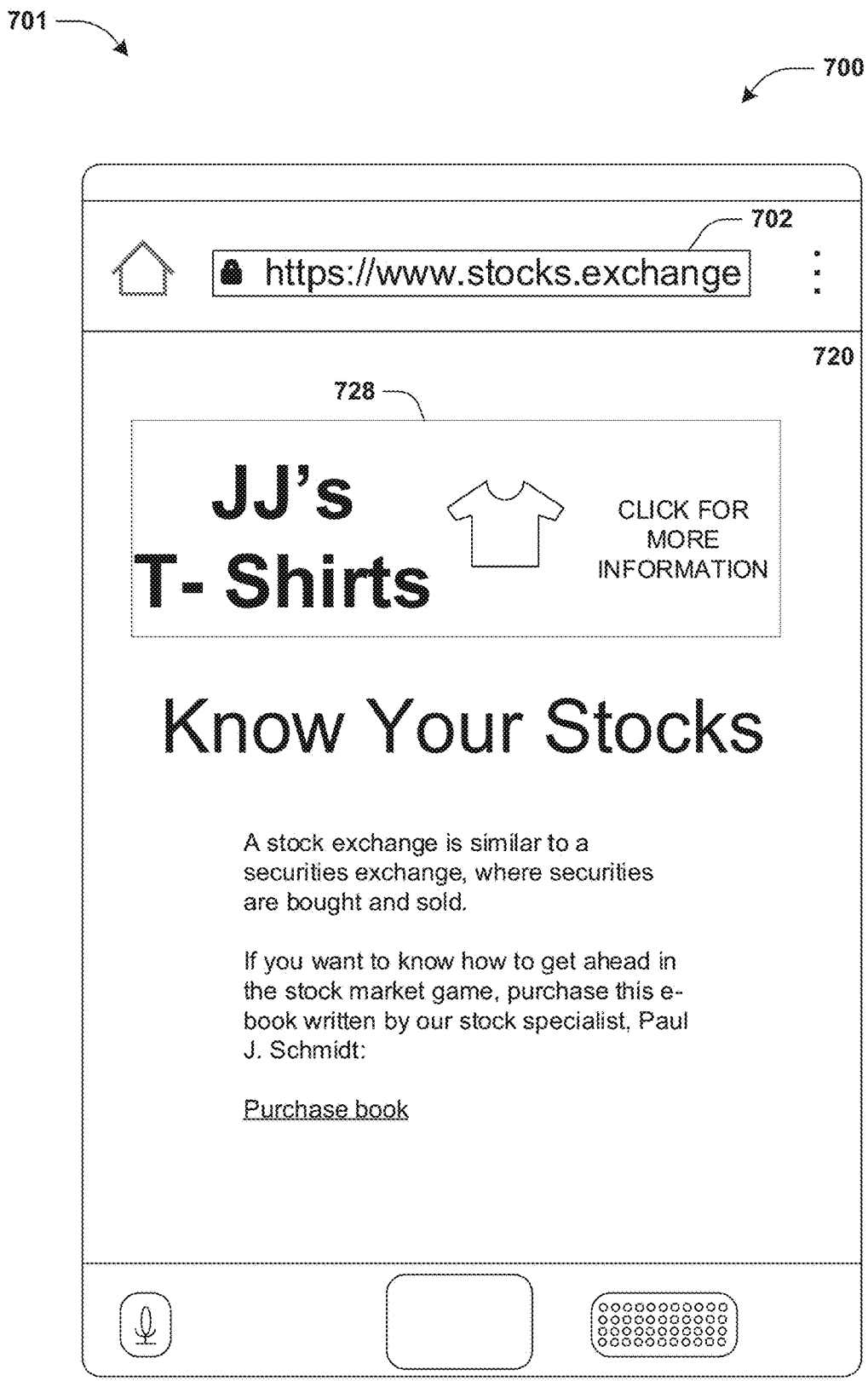
FIG. 7F is a diagram illustrating an exemplary system for determining user funnel stage scores and/or selecting content for transmission to devices, where a first client device presents and/or accesses a fourth web page using a browser of the first client device.

In some examples, the transmission content item may be transmitted to the first client device 700. FIG. 7F illustrates the first client device 700 presenting and/or accessing the fourth web page 720 using the browser of the first client device 700. For example, the content system may provide a content item 728 (e.g., the transmission content item) to be presented via the fourth web page 720 while the fourth web page 720 is accessed by the first client device 700.

In some examples, the user profile database may be analyzed to identify a third set of user profiles (e.g., a set of one or more user profiles) associated with a third set of client devices (e.g., a set of one or more client devices). Each user profile of the third set of user profiles may comprise activity information associated with a client device of the third set of client devices. In some examples, the third set of user profiles may comprise one or more user profiles of the second set of user profiles. Alternatively and/or additionally, the third set of user profiles may not comprise one or more user profiles of the second set of user profiles. In some examples, the third set of user profiles may be identified based upon a determination that each client device of the third set of client devices received and/or presented a content item associated with the first entity and/or a content item of the one or more content items (associated with the advertisement campaign).

A third set of vector representations (e.g., a set of one or more vector representations) may be generated based upon the third set of user profiles. For example, a third set of bag of words representations may be generated based upon the third set of user profiles. The third set of vector representations may be generated based upon the third set of bag of words representations. Alternatively and/or additionally, the third set of vector representations may be generated based upon the third set of user profiles (automatically and/or directly, without generating the third set of bag of words representations).

In some examples, a first set of user funnel stage scores (e.g., a set of one or more user funnel stage scores) and/or a first set of conversion probability scores (e.g., a set of one or more conversion probability scores) may be generated based upon the third set of vector representations, the first set of vector representations and/or the second set of vector representations. For example, the first set of user funnel stage scores and/or the first set of conversion probability scores may be generated based upon a comparison of the third set of vector representations with the first set of vector representations and/or the second set of vector representations. Alternatively and/or additionally, the first set of user funnel stage scores and/or the first set of conversion probability scores may be generated using the machine learning system. Each user funnel stage score of the first set of user funnel stage scores may be a representation of a funnel stage that a user (associated with the user funnel stage score) is associated with, with respect to the first entity and/or the advertisement campaign. Alternatively and/or additionally, each conversion probability score of the first set of conversion probability scores may be indicative of a probability that a user and/or a client device (of the third set of client devices) will perform a conversion event (associated with the first entity and/or the advertisement campaign).

In some examples, a report may be generated based upon the first set of user funnel stage scores and/or the first set of conversion probability scores. For example, the report may be indicative of a plurality of proportions (and/or percentages), wherein each proportion of the plurality of proportions is associated with a stage of the plurality of stages of the purchase funnel. For example, each proportion of the plurality of proportions may correspond to a proportion of users that are associated with a stage of the plurality of stages to a set of users (associated with the third set of user profiles). In some examples, the report may be transmitted to one or more client devices associated with the first entity.

For example, a first proportion of the plurality of proportions may be indicative of a proportion of first users, associated with the first stage, to the set of users, a second proportion of the plurality of proportions may be indicative of a proportion of second users, associated with the second stage, to the set of users, etc.

In some examples, the one or more content items (associated with the advertisement campaign) may be modified (e.g., changed) based upon the report. For example, responsive to determining that the first proportion is greater than a first threshold proportion, one or more added content items may be added to the one or more content items associated with the advertisement campaign (automatically). The one or more added content items may be associated with the first stage of the plurality of stages (e.g., the one or more added content items may be associated with promoting brand awareness associated with the first entity such that the first proportion of the first users to the set of users may be reduced over time). Alternatively and/or additionally, a content item of the one or more content items (associated with the advertisement campaign) may be modified (automatically) to generate a modified content item (e.g., one or more of a message of the content item may be removed, a message may be added to the content item, a picture of the content item may be removed, a picture may be added to the content item, etc.). For example, the modified content item may be transmitted to one or more client devices associated with one or more users of the first users associated with the first stage of the plurality of stages such that that the first proportion of users, associated with the first stage, to the set of users may be reduced over time (e.g., the modified content item may be associated with promoting brand awareness associated with the first entity).

In some examples, reports (comprising the first report) may be generated periodically (e.g., weekly, monthly, etc.). The reports may be associated with user funnel stage scores associated with the first entity and/or one or more advertisement campaigns associated with the first entity. The reports may be analyzed to determine whether the one or more advertisement campaigns are effective at increasing conversion probabilities of users and/or moving users downwards through the purchase funnel (e.g., causing user funnel stage scores of users to move towards the sixth stage (e.g., "conversion")).

For example, a first report of the reports may be generated at a first time and/or a second report of the reports may be generated at a second time, after the first time. The first report and/or the second report may be associated with one or more first advertisement campaigns.

In a first example, the first report may be indicative of an average user of a set of users being associated with the first stage of the plurality of stages of the purchase funnel. Alternatively and/or additionally, the first report may be indicative of 80% of the set of users being associated with the first stage, 6% of the set of users being associated with the second stage, 5% of the set of users being associated with the third stage, 4% of the set of users being associated with the fourth stage, 3% of the set of users being associated with the fifth stage and/or 2% of the set of users being associated with the sixth stage. The second report may be indicative of an average user of a set of users being associated with the second stage of the plurality of stages of the purchase funnel. Alternatively and/or additionally, the first report may be indicative of 40% of the set of users being associated with the first stage, 30% of the set of users being associated with the second stage, 15% of the set of users being associated with the third stage, 6% of the set of users being associated with the fourth stage, 5% of the set of users being associated with the fifth stage and/or 4% of the set of users being associated with the sixth stage.

Accordingly, in the first example, it may be determined based upon the first report and/or the second report (and/or based upon a comparison between the first report and the second report) that the one or more first advertisement campaigns are successful in moving users downwards through the purchase funnel (e.g., causing user funnel stage scores of users to move towards the sixth stage (e.g., "conversion")).

In a second example, the first report may be indicative of an average user of a set of users being associated with the second stage of the plurality of stages of the purchase funnel. Alternatively and/or additionally, the first report may be indicative of 40% of the set of users being associated with the first stage, 30% of the set of users being associated with the second stage, 15% of the set of users being associated with the third stage, 6% of the set of users being associated with the fourth stage, 5% of the set of users being associated with the fifth stage and/or 4% of the set of users being associated with the sixth stage. The second report may be indicative of an average user of a set of users being associated with the first stage of the plurality of stages of the purchase funnel. Alternatively and/or additionally, the second report may be indicative of 80% of the set of users being associated with the first stage, 6% of the set of users being associated with the second stage, 5% of the set of users being associated with the third stage, 4% of the set of users being associated with the fourth stage, 3% of the set of users being associated with the fifth stage and/or 2% of the set of users being associated with the sixth stage.

Accordingly, in the second example, it may be determined based upon the first report and/or the second report (and/or based upon a comparison between the first report and the second report) that the one or more first advertisement campaigns are not successful in moving users downwards through the purchase funnel (e.g., causing user funnel stage scores of users to move towards the sixth stage (e.g., "conversion")). Responsive to determining that the one or more first advertisement campaigns are not successful in moving users downwards through the purchase funnel, one or more content items associated with the one or more first advertisement campaigns may be modified (automatically) (e.g., a content item may be removed from the one or more content items, a content item may be added to the one or more content items, a content item of the one or more content items may be modified, etc.).

It may be appreciated that the disclosed subject matter may assist a user (and/or a client device associated with the user) in viewing and/or consuming content associated with subject matter that the user has an interest in.

Implementation of at least some of the disclosed subject matter may lead to benefits including, but not limited to, a reduction in screen space and/or an improved usability of a display (e.g., of the client device) (e.g., as a result of enabling the user to automatically consume content associated with subject matter that the user has an interest in, wherein the user may not view content that the user does not have an interest in, wherein the user may not need to open a separate application and/or a separate window in order to find content having the subject matter that the user has an interest in, etc.).

Alternatively and/or additionally, implementation of at least some of the disclosed subject matter may lead to benefits including a reduction in bandwidth (e.g., as a result of reducing a need for the user to open a separate application and/or a separate window in order to search throughout the internet and/or navigate through internet content to find content that the user has an interest in).

Alternatively and/or additionally, implementation of at least some of the disclosed subject matter may lead to benefits including more accurate and precise transmission of content to intended users (e.g., as a result of automatically determining user funnel stage scores and/or conversion probabilities associated with users, as a result of transmitting content to each user based upon the user funnel stage scores and/or the conversion probabilities, etc.).

Alternatively and/or additionally, implementation of at least some of the disclosed subject matter may lead to benefits including a faster identification of content to be transmitted and/or faster loading of the content on a receiving device. For example, by using user profiles, bag of words representations, vector representations, machine learning models, and/or user funnel stage scores as provided for herein, accurate content can be identified at an increased speed, and thus delay between receiving a request for content and transmission of the content and/or displaying of the content can be reduced.

Alternatively and/or additionally, implementation of at least some of the disclosed subject matter may lead to benefits including less manual effort (e.g., as a result of training the machine learning system using the first set of vector representations and/or the second set of vector representations (e.g., the plurality of subsets of vector representations) automatically, wherein editor inputted training data is not required because of automatic identification of the first set of user profiles and/or the second set of user profiles from the user profile and/or because of automatic generation of the first set of vector representations and/or the second set of vector representations based upon the first set of user profiles and/or the second set of user profiles, as a result of determining user funnel stage scores associated with user profiles based upon the first set of vector representations and/or the second set of vector representations automatically, etc.).

In some examples, at least some of the disclosed subject matter may be implemented on a client device, and in some examples, at least some of the disclosed subject matter may be implemented on a server (e.g., hosting a service accessible via a network, such as the Internet).

Figure 8:
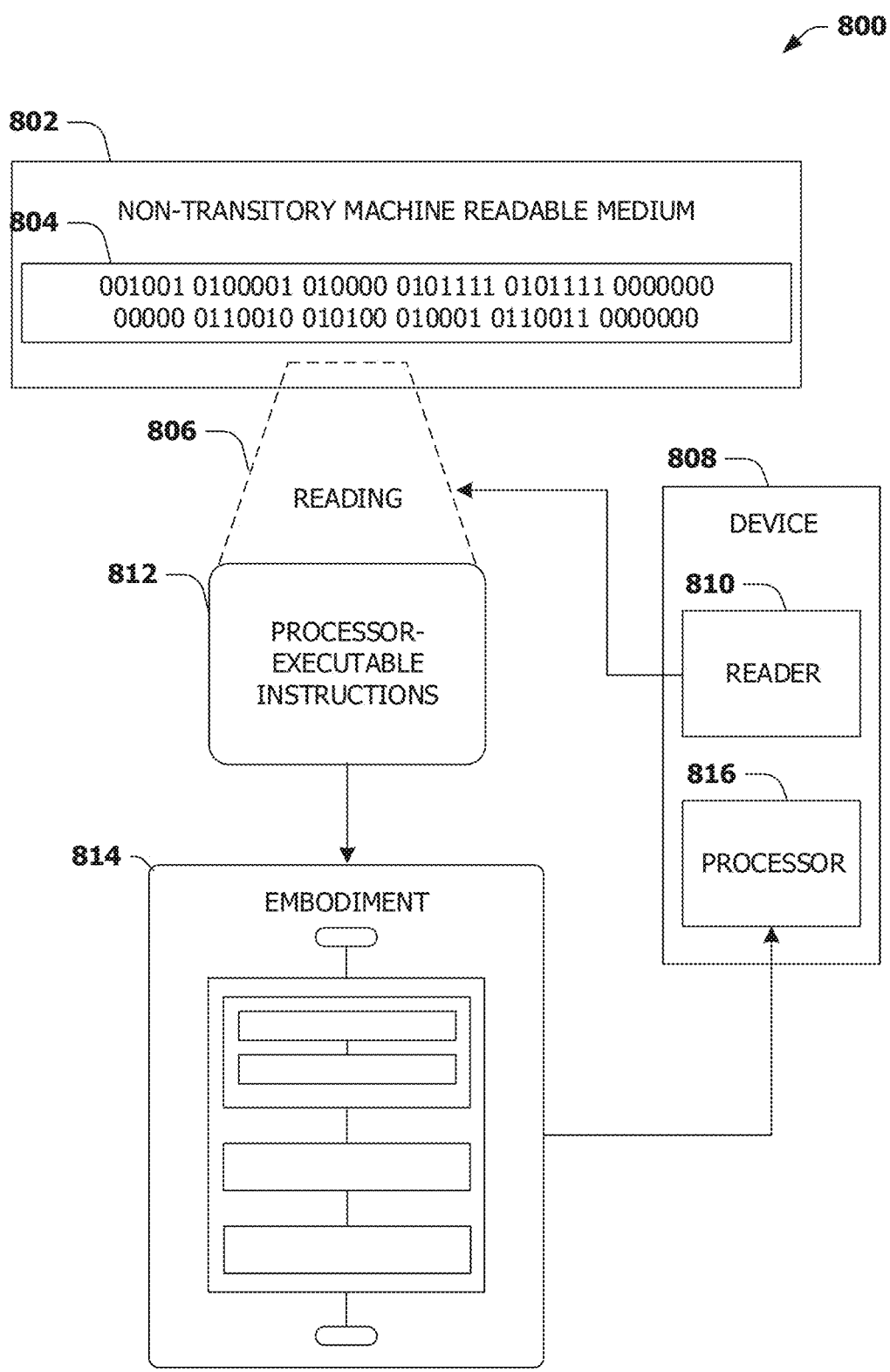
FIG. 8 is an illustration of a scenario featuring an example non-transitory machine readable medium in accordance with one or more of the provisions set forth herein.

FIG. 8 is an illustration of a scenario 800 involving an example non-transitory machine readable medium 802. The non-transitory machine readable medium 802 may comprise processor-executable instructions 812 that when executed by a processor 816 cause performance (e.g., by the processor 816) of at least some of the provisions herein (e.g., embodiment 814). The non-transitory machine readable medium 802 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 802 stores computer-readable data 804 that, when subjected to reading 806 by a reader 810 of a device 808 (e.g., a read head of a hard disk drive, or a read operation invoked on a solid-state storage device), express the processor-executable instructions 812. In some embodiments, the processor-executable instructions 812, when executed, cause performance of operations, such as at least some of the example method 500 of FIG. 5, for example. In some embodiments, the processor-executable instructions 812 are configured to cause implementation of a system, such as at least some of the exemplary system 601 of FIGS. 6A-6B, and/or at least some of the exemplary system 701 of FIGS. 7A-7F, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
analyzing a user profile database to identify:
   a first set of user profiles associated with a first set of client devices, wherein:
      each client device of the first set of client devices is associated with a conversion event associated with a first entity; and
      each user profile of the first set of user profiles comprises activity information associated with a client device of the first set of client devices; and
   a second set of user profiles associated with a second set of client devices, wherein:
      each client device of the second set of client devices is not associated with a conversion event associated with the first entity; and
      each user profile of the second set of user profiles comprises activity information associated with a client device of the second set of client devices;
generating, based upon the first set of user profiles, a first set of conversion vector representations, wherein each vector representation of the first set of conversion vector representations is associated with a user profile, of the first set of user profiles, associated with a client device that is associated with a conversion event associated with the first entity;
generating, based upon the second set of user profiles, a second set of non-conversion vector representations, wherein each vector representation of the second set of non-conversion vector representations is associated with a user profile, of the second set of user profiles, associated with a client device that is not associated with a conversion event associated with the first entity;
receiving a request for content associated with a first client device;
analyzing the user profile database to identify a first user profile associated with the first client device, wherein the first user profile comprises first activity information associated with the first client device;
generating, based upon the first user profile, a first vector representation;
generating a user funnel stage score associated with the first entity based upon:
   the first vector representation generated based upon the first user profile;
   the first set of conversion vector representations generated based upon the first set of user profiles that are each associated with a client device that is associated with a conversion event associated with the first entity; and
   the second set of non-conversion vector representations generated based upon the second set of user profiles that are each associated with a client device that is not associated with a conversion event associated with the first entity; and
selecting a transmission content item for transmission to the first client device based upon the user funnel stage score.

2. The method of claim 1, wherein the generating the first set of conversion vector representations comprises:
for each user profile of the first set of user profiles:
   generating a bag of words representation based upon the user profile, wherein the bag of words representation is indicative of:
      a set of activities performed using a client device associated with the user profile; and
      a quantity of occasions associated with each activity of the set of activities; and
   generating, based upon the bag of words representation, a vector representation of the first set of conversion vector representations associated with the user profile.

3. The method of claim 1, wherein the user funnel stage score is generated based upon a comparison of the first vector representation with the first set of conversion vector representations and the second set of non-conversion vector representations.

4. The method of claim 1, comprising:
grouping the second set of non-conversion vector representations into a plurality of subsets of vector representations.

5. The method of claim 4, comprising:
generating a plurality of conversion probability scores, wherein each conversion probability score of the plurality of conversion probability scores is generated based upon the first vector representation, the first set of conversion vector representations and a subset of vector representations of the plurality of subsets of vector representations; and
combining the plurality of conversion probability scores to generate a first conversion probability score associated with the first entity, wherein the user funnel stage score is generated based upon the first conversion probability score.

6. The method of claim 4, comprising:
training a plurality of machine learning models using the first set of conversion vector representations and the second set of non-conversion vector representations, wherein each machine learning model of the plurality of machine learning models is trained using a subset of vector representations of the plurality of subsets of vector representations.

7. The method of claim 6, comprising:
generating a plurality of conversion probability scores, based upon the first vector representation, using the plurality of machine learning models, wherein each conversion probability score of the plurality of conversion probability scores is generated using a machine learning model, of the plurality of machine learning models, associated with a subset of vector representations of the plurality of subsets of vector representations.

8. The method of claim 7, comprising:
combining the plurality of conversion probability scores to generate a first conversion probability score associated with the first entity, wherein the user funnel stage score is generated based upon the first conversion probability score.

9. The method of claim 1, wherein each vector representation of at least one of the first set of conversion vector representations or the second set of non-conversion vector representations is based upon two or more variables associated with a user profile.

10. The method of claim 1, comprising transmitting the transmission content item to the first client device.

11. A computing device comprising:
a processor; and
memory comprising processor-executable instructions that when executed by the processor cause performance of operations, the operations comprising:
   analyzing a user profile database to identify:
      a first set of user profiles associated with a first set of client devices, wherein:

each client device of the first set of client devices is associated with a conversion event associated with a first entity; and each user profile of the first set of user profiles comprises activity information associated with a client device of the first set of client devices; and a second set of user profiles associated with a second set of client devices, wherein:

each client device of the second set of client devices is not associated with a conversion event associated with the first entity; and each user profile of the second set of user profiles comprises activity information associated with a client device of the second set of client devices;

generating, based upon the first set of user profiles, a first set of conversion vector representations, wherein each vector representation of the first set of conversion vector representations is associated with a user profile, of the first set of user profiles, associated with a client device that is associated with a conversion event associated with the first entity;

generating, based upon the second set of user profiles, a second set of non-conversion vector representations, wherein each vector representation of the second set of non-conversion vector representations is associated with a user profile, of the second set of user profiles, associated with a client device that is not associated with a conversion event associated with the first entity;

analyzing the user profile database to identify a third set of user profiles associated with a third set of client devices, wherein each user profile of the third set of user profiles comprises activity information associated with a client device of the third set of client devices;

generating, based upon the third set of user profiles, a third set of vector representations, wherein each vector representation of the third set of vector representations is associated with a user profile of the third set of user profiles; and generating a set of user funnel stage scores associated with the first entity based upon:

the third set of vector representations generated based upon the first set of user profiles;

the first set of conversion vector representations generated based upon the first set of user profiles that are each associated with a client device that is associated with a conversion event associated with the first entity; and the second set of non-conversion vector representations generated based upon the second set of user profiles that are each associated with a client device that is not associated with a conversion event associated with the first entity.

12. The computing device of claim 11, wherein the generating the first set of conversion vector representations comprises:

for each user profile of the first set of user profiles:

generating a bag of words representation based upon the user profile, wherein the bag of words representation is indicative of:

a set of activities performed using a client device associated with the user profile; and a quantity of occasions associated with each activity of the set of activities; and generating, based upon the bag of words representation, a vector representation of the first set of conversion vector representations associated with the user profile.

13. The computing device of claim 11, wherein the set of user funnel stage scores is generated based upon a comparison of each vector representation of the third set of vector representations with the first set of conversion vector representations and the second set of non-conversion vector representations.

14. The computing device of claim 11, the operations comprising:

grouping the second set of non-conversion vector representations into a plurality of subsets of vector representations; and for each vector representation of the third set of vector representations:

generating a plurality of conversion probability scores, wherein each conversion probability score of the plurality of conversion probability scores is generated based upon the vector representation, the first set of conversion vector representations and a subset of vector representations of the plurality of subsets of vector representations; and combining the plurality of conversion probability scores to generate a first conversion probability score associated with the first entity, wherein a user funnel stage score of the set of user funnel stage scores, associated with the vector representation, is generated based upon the first conversion probability score.

15. The computing device of claim 11, the operations comprising:

generating, based upon the set of user funnel stage scores, a report.

16. A non-transitory machine readable medium having stored thereon processor-executable instructions that when executed cause performance of operations, the operations comprising:

analyzing a user profile database to identify:

a first set of user profiles associated with a first set of client devices, wherein:

each client device of the first set of client devices is associated with a conversion event associated with a first entity; and each user profile of the first set of user profiles comprises activity information associated with a client device of the first set of client devices; and a second set of user profiles associated with a second set of client devices, wherein:

each client device of the second set of client devices is not associated with a conversion event associated with the first entity; and each user profile of the second set of user profiles comprises activity information associated with a client device of the second set of client devices;

generating, based upon the first set of user profiles, a first set of conversion vector representations, wherein each vector representation of the first set of conversion vector representations is associated with a user profile, of the first set of user profiles, associated with a client device that is associated with a conversion event associated with the first entity;

generating, based upon the second set of user profiles, a second set of non-conversion vector representations, wherein each vector representation of the second set of non-conversion vector representations is associated with a user profile of the second set of user profiles, associated with a client device that is not associated with a conversion event associated with the first entity;

receiving a request for content associated with a first client device;

analyzing the user profile database to identify a first user profile associated with the first client device, wherein the first user profile comprises first activity information associated with the first client device;

generating, based upon the first user profile, a first vector representation;

generating a user funnel stage score associated with the first entity based upon:

the first vector representation generated based upon the first user profile;

the first set of conversion vector representations generated based upon the first set of user profiles that are each associated with a client device that is associated with a conversion event associated with the first entity; and the second set of non-conversion vector representations generated based upon the second set of user profiles that are each associated with a client device that is not associated with a conversion event associated with the first entity; and selecting a transmission content item for transmission to the first client device based upon the user funnel stage score.

17. The non-transitory machine readable medium of claim 16, wherein the generating the first set of conversion vector representations comprises:

for each user profile of the first set of user profiles:

generating a bag of words representation based upon the user profile, wherein the bag of words representation is indicative of:

a set of activities performed using a client device associated with the user profile; and a quantity of occasions associated with each activity of the set of activities; and generating, based upon the bag of words representation, a vector representation of the first set of conversion vector representations associated with the user profile.

18. The non-transitory machine readable medium of claim 16, wherein the user funnel stage score is generated based upon a comparison of the first vector representation with the first set of conversion vector representations and the second set of non-conversion vector representations.

19. The non-transitory machine readable medium of claim 16, the operations comprising:

grouping the second set of non-conversion vector representations into a plurality of subsets of vector representations.

20. The non-transitory machine readable medium of claim 19, the operations comprising:

generating a plurality of conversion probability scores, wherein each conversion probability score of the plurality of conversion probability scores is generated based upon the first vector representation, the first set of conversion vector representations and a subset of vector representations of the plurality of subsets of vector representations; and combining the plurality of conversion probability scores to generate a first conversion probability score associated with the first entity, wherein the user funnel stage score is generated based upon the first conversion probability score.

* * * * *